US006966654B2

(12) United States Patent
Ozawa et al.

(10) Patent No.: US 6,966,654 B2
(45) Date of Patent: Nov. 22, 2005

(54) PROJECTOR

(75) Inventors: Takaaki Ozawa, Shiojih (JP); Toshio Matsumiya, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/477,897

(22) PCT Filed: May 27, 2002

(86) PCT No.: PCT/JP02/05099

§ 371 (c)(1),
(2), (4) Date: Nov. 19, 2003

(87) PCT Pub. No.: WO02/097529

PCT Pub. Date: Dec. 5, 2002

(65) Prior Publication Data

US 2004/0169825 A1 Sep. 2, 2004

(30) Foreign Application Priority Data

May 28, 2001 (JP) ............................ 2001-158851

(51) Int. Cl.[7] ............................................ G03B 21/16
(52) U.S. Cl. ........................................ 353/61; 353/57
(58) Field of Search ............................ 353/61, 52, 57, 353/58, 60, 30, 31, 119; 352/146; 349/5, 349/20, 72, 161, 71; 372/22, 36; 348/750

(56) References Cited

U.S. PATENT DOCUMENTS

| | | | | |
|---|---|---|---|---|
| 4,925,295 | A * | 5/1990 | Ogawa et al. | 353/57 |
| 5,876,105 | A | 3/1999 | Rodriquez, Jr. | 353/119 |
| 6,111,630 | A | 8/2000 | Watanuki et al. | 349/161 |
| 6,422,703 | B1 * | 7/2002 | Wang et al. | 353/61 |
| 6,481,854 | B1 * | 11/2002 | Sugawara et al. | 353/52 |
| 2001/0021006 | A1 * | 9/2001 | Shimizu | 353/57 |

* cited by examiner

*Primary Examiner*—Judy Nguyen
*Assistant Examiner*—Rochelle Blackman
(74) *Attorney, Agent, or Firm*—Oliff & Berridge, PLC

(57) ABSTRACT

A projector comprises a light source device 413 in which a light source cooling air flow channel X for introducing a cooling air to an internal light source lamp 411 is formed and an internal housing 47 for housing an optical element unit 600, which subjects the light beam emitted from this light source device 413 to an optical processing. The internal housing 47 is formed with a pair of optical element cooling opening portions 471A, 472A, which are oppositely arranged by mutually pinching the optical element unit 600 in order to allow a cooling air to pass through according to the arrangement of the optical element unit 600. Further, the underside of the internal housing 47 is provided with a fan 54, in which a suction port 54A is directed to the opening portion 471A and an exhaust port 54B is connected to the light source cooling air flow channel X. Since an air flows along an arrow marked channel, the optical element unit 600 and the light source lamp 411 can be sufficiently cooled.

13 Claims, 15 Drawing Sheets

PROJECTOR

TECHNICAL FIELD

The present invention relates to a projector, which modulates a light beam emitted from a light source and magnifies and projects it so as to form a projection image.

BACKGROUND ART

Hitherto, at conferences, academic conferences, exhibitions and the like, projectors have been in heavy usage.

As such projectors, for example, those constitutions and the like comprising an optical system, which modulates a light beam emitted from a light source and magnifies and projects it so as to form a projection image according to image information by using various optical parts, and an exterior case housing this optical system are known. Further, such an optical system is constituted by comprising an illumination optical system for subjecting the light beam emitted from a light source device including a light source lamp to an optical processing and an optical part housing for housing optical elements which constitute this illumination optical system.

In a polarizing conversion element which is one of such optical elements, the light beam emitted from the light source lamp is separated into two linear polarized lights of horizontal and vertical directions by a polarization beam splitter (PBS), and from among these polarized lights, the linear polarized light of the horizontal direction is converted into the linear polarized light of the vertical direction by a phase film. In this way, the light beam emitted from the light source device becomes the linear polarized light of a predetermined direction, thereby increasing a use efficiency of the light beam.

Such a polarizing conversion element is fabricated by gluing and connecting the polarization beam splitter and the phase film made of resin by an adhesive. For this reason, when an excessive heat is applied to the polarizing conversion element for a long period of time, the phase film made of resin is deformed or relative positions of the polarization beam splitter and the phase film are changed due to the hardening of the adhesive, thereby making it hard to perform a correct optical processing.

On the other hand, the light source device generates a high heat by emission of the light source lamp, and causes illumination optical elements such as the neighboring polarizing conversion element and the like to be heated. In view of these points, it becomes an important subject for study how effectively the polarizing conversion element and the light source device should be cooled.

Hence, to cool the optical system including the polarizing conversion element and the light source device, a cooling structure has been adopted, in which suction and exhaustion ports are formed in the exterior case which houses the optical system, and at the same time a fan is arranged in the interior thereof.

However, in the case of such a cooling structure, even though the whole optical system in the interior of the exterior case can be thoroughly cooled, there has been a problem in that the polarizing conversion element and the light source device which particularly require a cooling are not always sufficiently cooled.

Note that such a problem was not limited to the polarizing conversion element alone, but also occurred on other optical elements including a lens array and the like.

An object of the present invention is to provide a projector, which can sufficiently cool the optical elements and the light source device.

DISCLOSURE OF THE INVENTION

The projector according to the present invention is a projector constituted by including a light source lamp and comprising: a light source device formed with a light source cooling air flow channel for introducing a cooling air to the internal light source lamp; an illumination optical system for subjecting a light beam emitted from this light source device to an optical processing; and an optical part housing for housing optical elements constituting this illumination optical system; and is characterized by forming in the optical part housing a pair of optical element cooling opening portions oppositely arranged by mutually pinching the optical elements in order to allow the cooling air to pass through according to the arrangement of the optical elements, and comprising a fan in which a suction port is directed to the one opening portion from among the pair of optical element cooling opening portions and an exhaust port is connected to the light source cooling air flow channel.

According to the present invention, the fan is driven so as to let an air flow as follows. That is, the cooling air existing at the external side of the optical part housing flows into the interior of the optical part housing through the other opening portion in a pair of optical element cooling opening portions formed in the optical part housing, and this cooling air flowed into the interior flows along the optical elements from the other opening portion side to the one opening portion side.

Then, the cooling air flowed to the one opening portion side of the optical elements is sucked into the interior of the fan from the suction port of the fan opposed to the one opening portion and, after that, is exhausted from the exhaust port of the fan to the light source cooling air flow channel connected to this exhaust port.

The cooling air flows into such a distribution channel so that the optical elements and the light source lamp are concentratedly cooled, thereby making it possible to sufficiently cool the light source lamp as well as the light source device and the optical elements.

Further, since the cooling air which firstly flows into the interior side of the optical part housing is the coolest air among the air in this distribution channel, the optical elements in which distortions and the like are easy to occur can be more effectively cooled, thereby making it possible to attempt the prolonging of the life of the optical elements.

Here, as the fan, for example, a Sirocco fan can be adopted. Since the Sirocco fan has an opening portion area of the exhaust port formed smaller than the opening portion area of the suction port, a discharge pressure of the air can be increased in contrast to other fans. For this reason, while the number of revolution is low in contrast to other fans, the Sirocco fan can secure an output of the same level, and yet has an excellent quietness.

Here, it is preferable that the projector comprises an electro optic device which modulates the light beam emitted from the light source device according to image information, and the other of the optical element cooling opening portions is arranged in opposition to a control board for controlling this electro optic device.

The control board is for controlling the electro optic device, and a circuit element weak to heat is mounted on its substrate.

Since such a control board is arranged in opposition to the other of the optical element cooling opening portions, when the cooling air existing at the exterior side of the optical part housing flows into the interior side of the optical part housing through the other optical element cooling opening portion, the cooling air flows along the control board, thereby cooling the circuit element also on the control board. In this way, the circuit element weak to heat can be cooled, so that the operation of the electro optic device as well as the projector can be reliably performed.

Further, it is preferable that the light source device comprises a reflector which aligns an emitting direction of the light beam emitted from the light source lamp and a transparent plate for closing a light emitting surface of this reflector, and the connecting portion of the reflector and this transparent plate is formed with a pair of lamp cooling opening portions symmetrically arranged with an optical axis of the reflector as a center, and a space between the exhaust port and either one of the pair of lamp cooling opening portions is connected through a duct member.

According to such a constitution, since the exhaust port of the fan and the one of the lamp cooling opening portions are connected by the duct member, the cooling air exhausted from the fan is reduced in leaking to other portions. For this reason, the air exhausted from the fan can be reliably blown to the light source cooling air flow channel, and the interior of the reflector, that is, the light source lamp can be effectively cooled, thereby making it possible to attempt the prolonging of the life of the light source lamp.

Further, a pair of lamp cooling opening portions is formed at symmetrical positions with the optical axis as a center so that the air is circulated in the interior of the reflector in a relatively wider range, thereby cooling the light source lamp more effectively.

Further, since the light source lamp is constituted by comprising the transparent plate for closing the light emitting surface of the reflector, when it is broken, the flying out in all directions of broken fragments and the like of the light source lamp can be prevented.

Note that such a duct member may be a duct for fastening the exhaust port of the fan and the one of the light source lamp cooling opening portions or may be in such a state that the end portion of the duct member is arranged in the vicinity of the exhaust port and the one of the light source lamp cooling opening portions, and the end portion of the duct member is not completely connected with the exhaust port and the one of the light source lamp cooling opening portions.

Further, it is preferable that a rectifying member is formed with a rectifying plate for rectifying the cooling air exhausted from the exhaust port.

By so doing, for example, in the case where the Sirocco fan is used as a fan, the discharge direction of the cooling air discharged eccentrically from the exhaust port by the rotation of this Sirocco fan can be regulated by the rectifying plate. For this reason, the cooling air flowing in the interior of the duct member by the rectifying plate is rectified so that the air flows smoothly to the light source cooling air flow channel, thereby cooling the light source lamp more effectively.

Here, in the case where the projector is constituted by providing the reflector and the transparent plate to the light source lamp and forming a pair of lamp cooling opening portions at the coupling portion of these reflector and transparent plate and providing the duct member connecting the exhaust port and the one of the pair of lamp cooling opening portions, it is preferable that a opening and closing mechanism for closing the lamp cooling opening portions is provided when the light source device is removed from the optical part housing.

In such a constitution, for example, even in the case where the light source lamp is broken and its replacement is required, since the lamp cooling opening portions are closed by the opening and closing mechanism when the light source device is removed from the optical part housing, the broken fragments and the like of the light source lamp will not fly out in the interior of the optical part housing through the lamp cooling opening portions. In this way, the flying out of the broken fragments in the interior of the optical part housing can be prevented so that the broken fragments and the like are not adhered to the operator of the projector, thereby eliminating the possibility of inflicting physical injuries on him by the broken fragments and the like.

It is preferable that a rib-shaped protrusion is formed so as to surround the one of the optical element cooling opening portions and at the same time to surround the suction port of the fan.

In this way, since the rib-shaped protrusion is formed so as to surround the one of the optical element cooling opening portions and the suction portion, there is provided a space corresponding to the protruded size of the protrusion between the one of the optical element cooling opening portions and the fan.

Here, instead of providing such a space, in the case where the distance between the suction port and the one of the optical element cooling opening portions becomes closer, since the fan is preoccupied with sucking just the air only in a specific place because of the nature of the fan and cools the specific region only, there exist some portions which are not much cooled in the optical elements. For this reason, a protrusion is formed so as to provide a predetermined space, so that the fan can suck the air thoroughly in the vicinity of the optical elements, thereby cooling the whole of the optical elements.

Further, since the protrusion surrounds the suction port and the one of the optical element cooling opening portions, the air flowing into the suction port from the gap between the protrusion and the fan can be reduced. For this reason, the fan can reliably suck the air in the interior of the optical part housing, so that the optical elements can be sufficiently cooled. At this time, it is preferable that the top end of the protrusion is made into a flat surface shape, and the periphery of the suction port of the fan is made into a flat surface-shape so that they are constituted such that the protrusion and the periphery of the suction port can completely abut against each other. By so doing, the cooling air can be more reliably sucked so that the optical elements can be cooled.

Further, it is preferable that an air accumulator consisting of a concave step portion is formed in the interior of the vicinity of the one of the optical element cooling opening portions.

By forming such an air accumulator consisting of the concave step portion, even in the case where the optical element cooling opening portions are smaller than the optical elements to be cooled, the fan can suck the air thoroughly in the vicinity of the optical elements, thereby cooling the whole of the optical elements.

BEST MODE FOR CARRYING OUT THE INVENTION

Hereinafter, one embodiment of the present invention will be described based on the drawings.

(1. Main Structure of the Projector)

Figure 1:
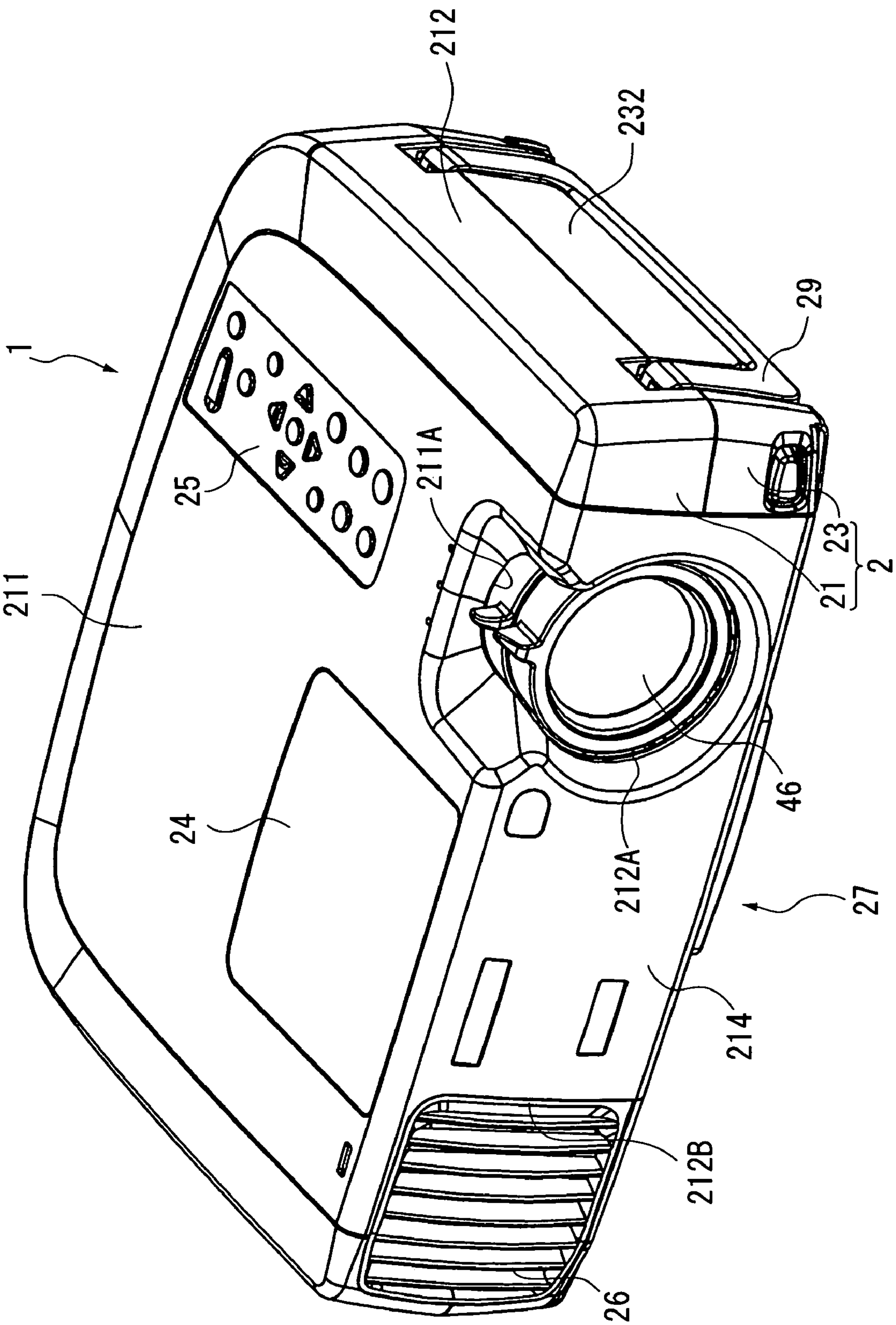
FIG. 1 is a whole perspective view seen from above of a projector according to one embodiment of the present invention.
Figure 2:
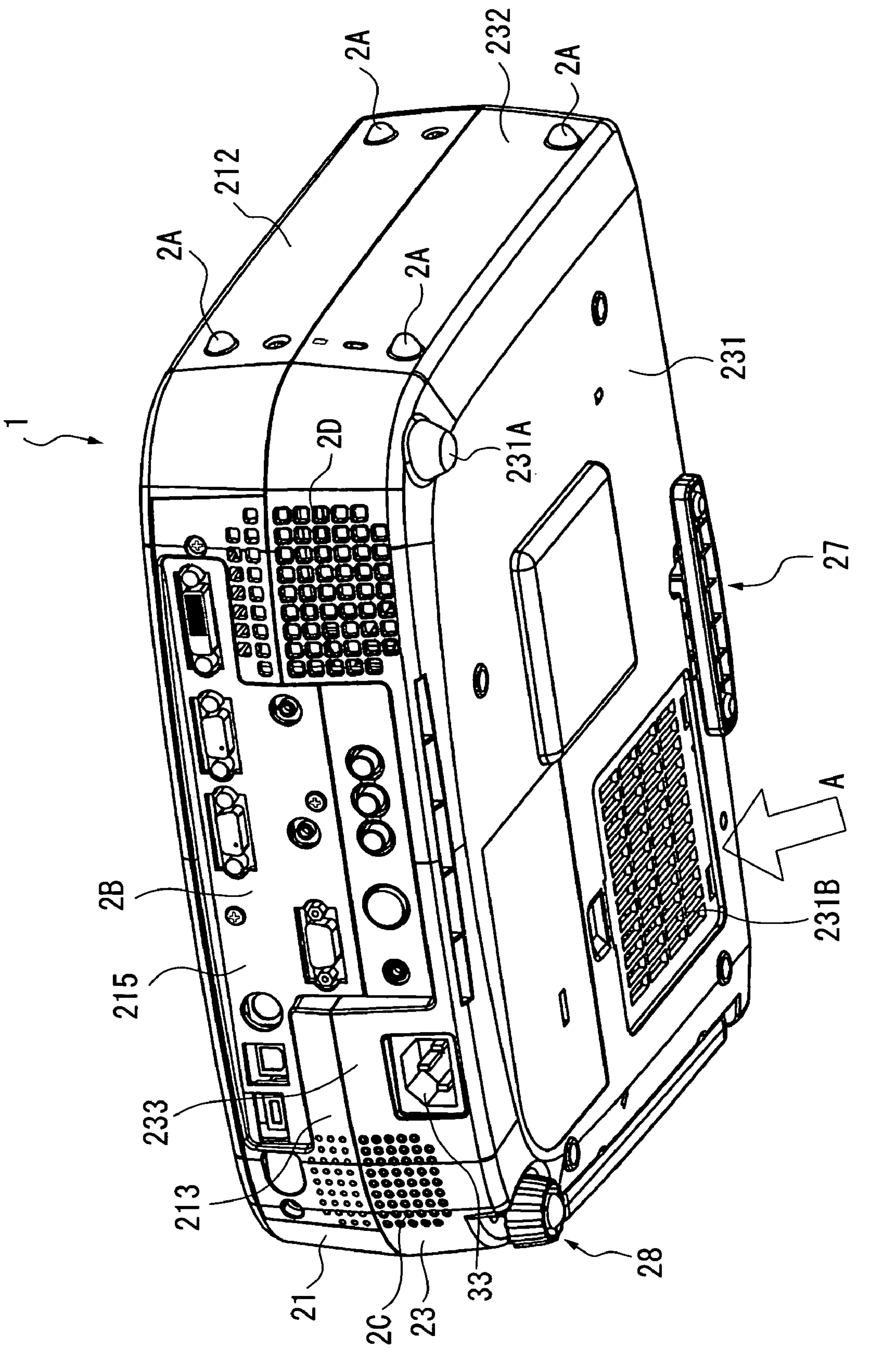
FIG. 2 is a whole perspective view seen from below of the projector according to the above-described embodiment.
Figure 3:
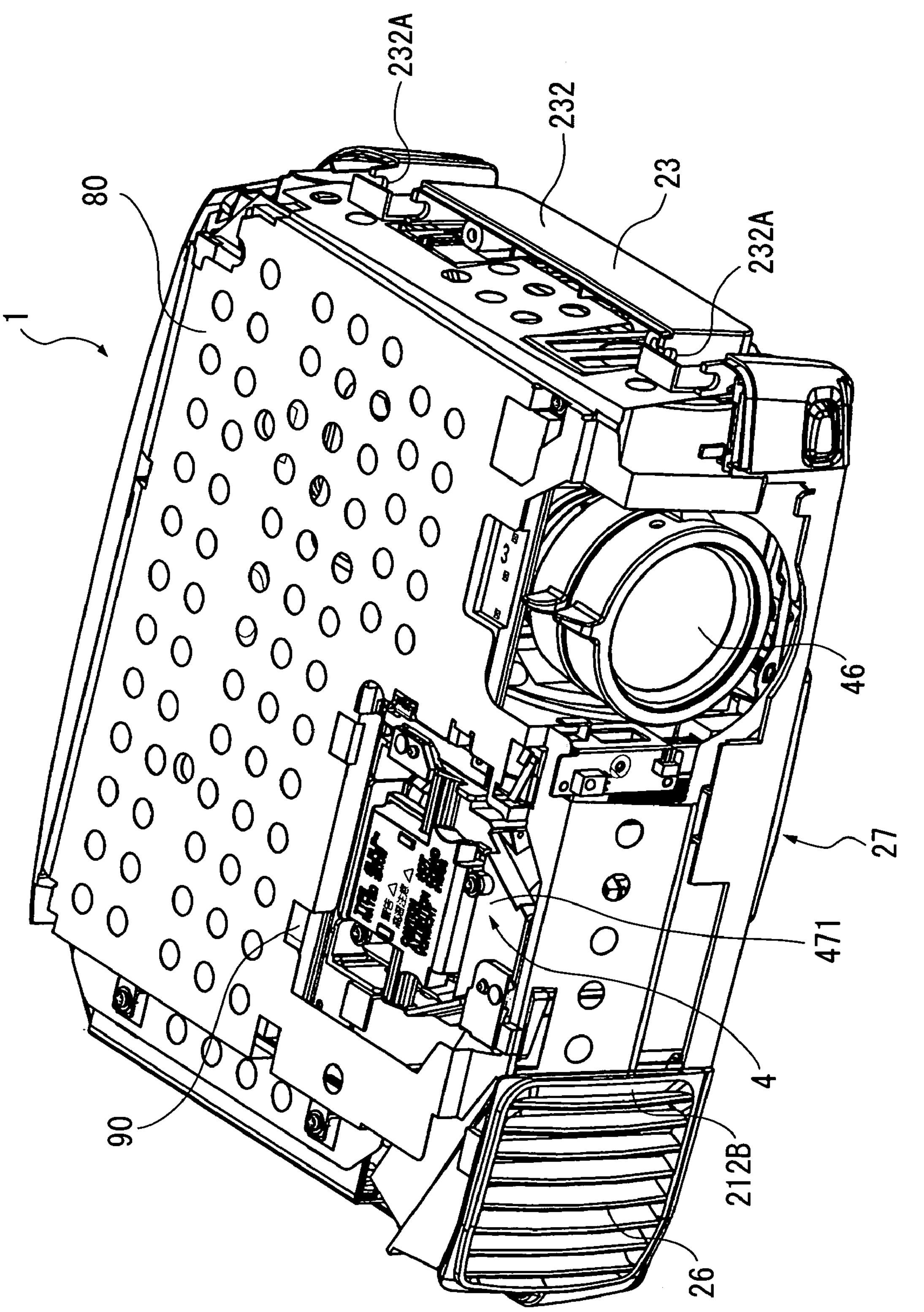
FIG. 3 is a perspective view showing a state in which an upper case is removed from the state shown in FIG. 1.
Figure 4:
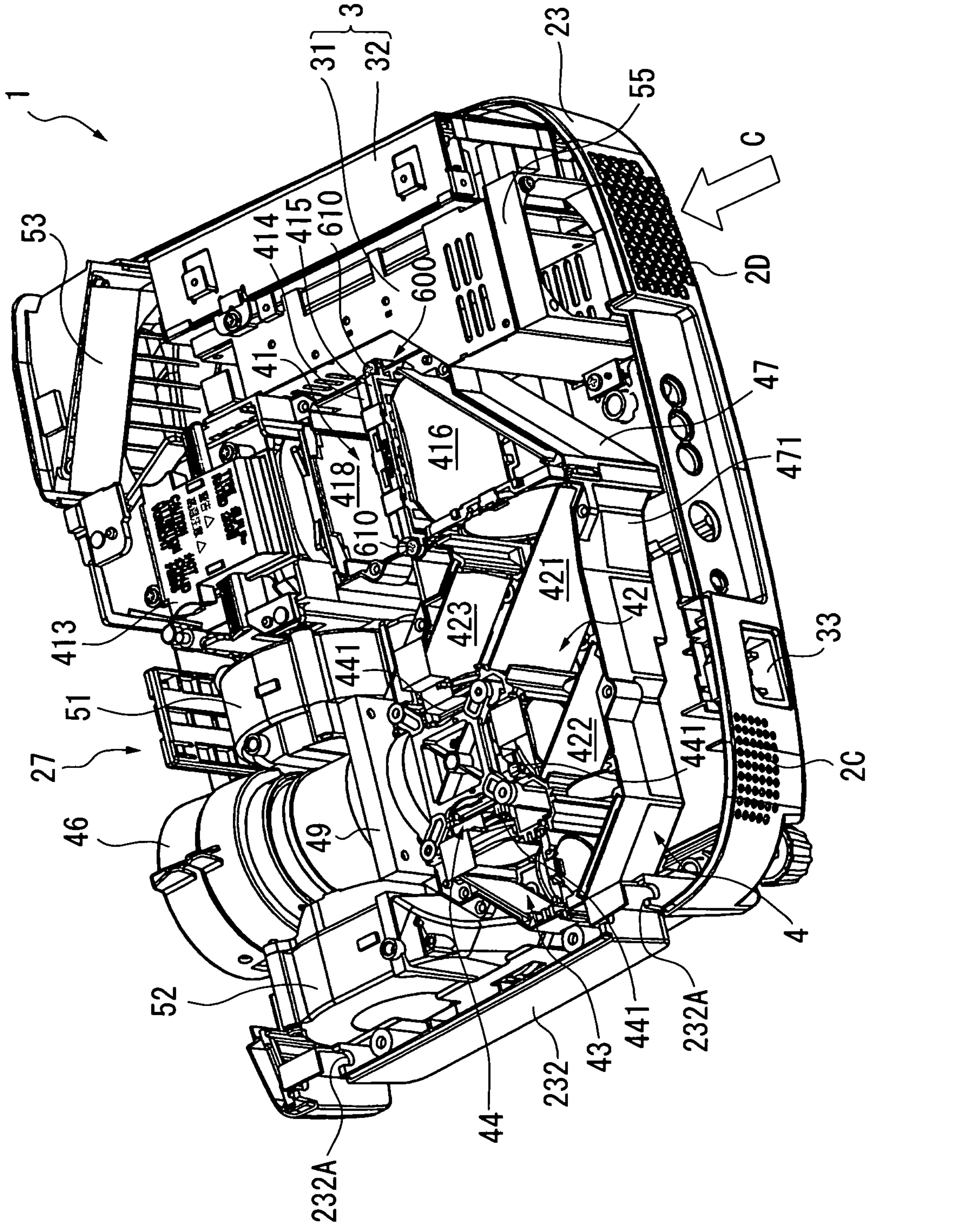
FIG. 4 is a perspective view seen from the backside of the state shown in FIG. 3 from which a shield plate, a driver board and an upper internal housing are removed.
Figure 5:
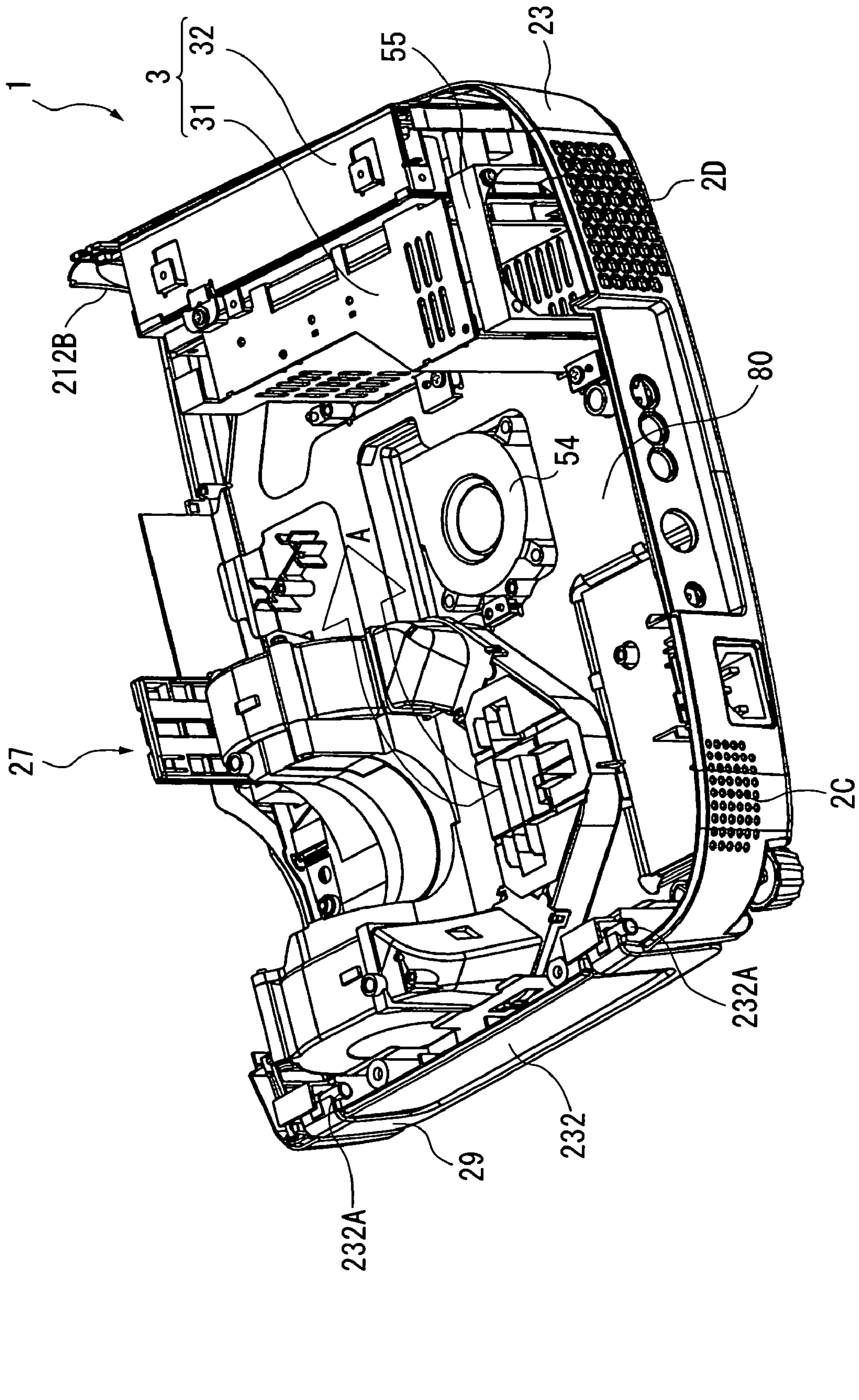
FIG. 5 is a perspective view showing a state from which an optical unit is removed from the state shown in FIG. 4.

FIG. 1 is a whole perspective view seen from above of a projector 1 according to the present embodiment, FIG. 2 is a whole perspective view seen from below of the projector 1 and FIGS. 3 to 5 are perspective views showing the interior of the projector 1.

Specifically, FIG. 3 is a view of a state in which an upper case 21 of the projector 1 is removed from the state shown in FIG. 1, FIG. 4 is view seen from the backside in which a shield plate 80, a driver board 90 and an upper internal housing 472 are removed from the state shown in FIG. 3, and FIG. 5 is a view in which an optical unit 4 is removed from the state shown in FIG. 4.

In FIGS. 1 to 3, the projector 1 comprises an exterior case 2, a power source unit 3 housed in the interior of the exterior case 2, and an optical unit 4 which is similarly arranged in the interior of the exterior case 2 and has a flat U-shape in its surface, and is formed approximately in the shape of a rectangular solid as a whole.

The exterior case 2 is formed of an upper case 21 and a lower case 23 which are made of resin respectively. These cases 21, 23 are fixed mutually by screws.

The upper case 21 is formed of an upper surface portion 211, a side face portion 212 provided on its periphery, a back face portion 213 and a front surface portion 214.

The forward side of the upper surface portion 211 is detachably mounted with a lamp cover 24 by a fitting system. Further, in the upper surface portion 211, the lateral side of the lamp cover 24 is provided with a notched portion 211A in which the upper surface portion of a projection lens 46 is exposed so that a zooming operation and a focusing operation of the projection lens 46 are performed manually through a lever. The rear side of this notched portion 211A is provided with an operation panel 25.

The front surface portion 214 comprises a round hole opening 212A, which continues to the notched portion 211A of the upper case 21, and the projection lens 46 is arranged corresponding to this round hole opening 212A. In this front surface portion 214, the opposite side to the round hole opening 212A is provided with an exhaust port 212B located at the forward side of the internal power source unit 3, and this exhaust port 212B is provided with an exhaust louver 26 which exhausts a cooling air in the direction deviated from an image projection area, that is, to the left side in FIG. 1 and at the same time serves as a light shielding (the exhaust louver 26 is actually mounted to the lower case 23).

The lower case 23 is formed of a bottom face portion 231, a side face portion 232 provided on its periphery and a back face portion 233.

The forward side of the bottom face portion 231 is provided with a position adjusting mechanism 27, which adjusts an inclination of the whole projector 1 and performs a positioning of a projection image. Further, the one corner portion of the rear side of the bottom face portion 231 is provided with a separate position adjusting mechanism 28 which adjusts the inclination to another direction of the projector 1, and the other corner portion is provided with a rear foot 231A. However, the rear foot 231A is unable to adjust its position. Further, the bottom face portion 231 is provided with a suction port 231B for a cooling air.

The one of the side face portions 232 is provided with mounting portions 232A for rotatably mounting a U-shaped handle 29.

In the one of the side surface sides of such exterior case 2, each of side face portions 212, 232 of the upper case 21 and the lower case 23 is provided with a side foot 2A (FIG. 2) which becomes a leg in the case when the projector 1 is put on end with the handle 29 placed on the upper side.

Further, the back surface side of the exterior case 2 is provided with an interface portion 2B which opens by straddling a back surface portion 213 of the upper case 21 and a back surface portion 233 of the lower case 23, and the interior of this interface portion 2B is provided with an interface cover 215, and further, the interior of the interface cover 215 is arranged with an interface substrate not shown mounted with various connectors. Further, both sides of the interface portion 2B are provided with a speaker hole 2C and suction portion 2D by straddling each of the back face portions 213, 233. The suction port 2D from among them is located at the rear side of the internal power unit 3.

The power source unit 3, as shown in FIG. 4, is constituted by a power source 31 and a lamp driving circuit (ballast) 32 located at the lateral side of the power source 31.

The power source 31 is for supplying an electric power supplied through a power source cable to the lamp driving circuit 32, a driver board 90 (FIG. 3) as a control board provided with the circuit element and the like, and comprises an inlet connector 33 (FIG. 2) into which the power source cable is inserted.

The lamp driving circuit 32 supplies the electric power to a light source lamp 411 of an optical unit 4.

Figure 6:
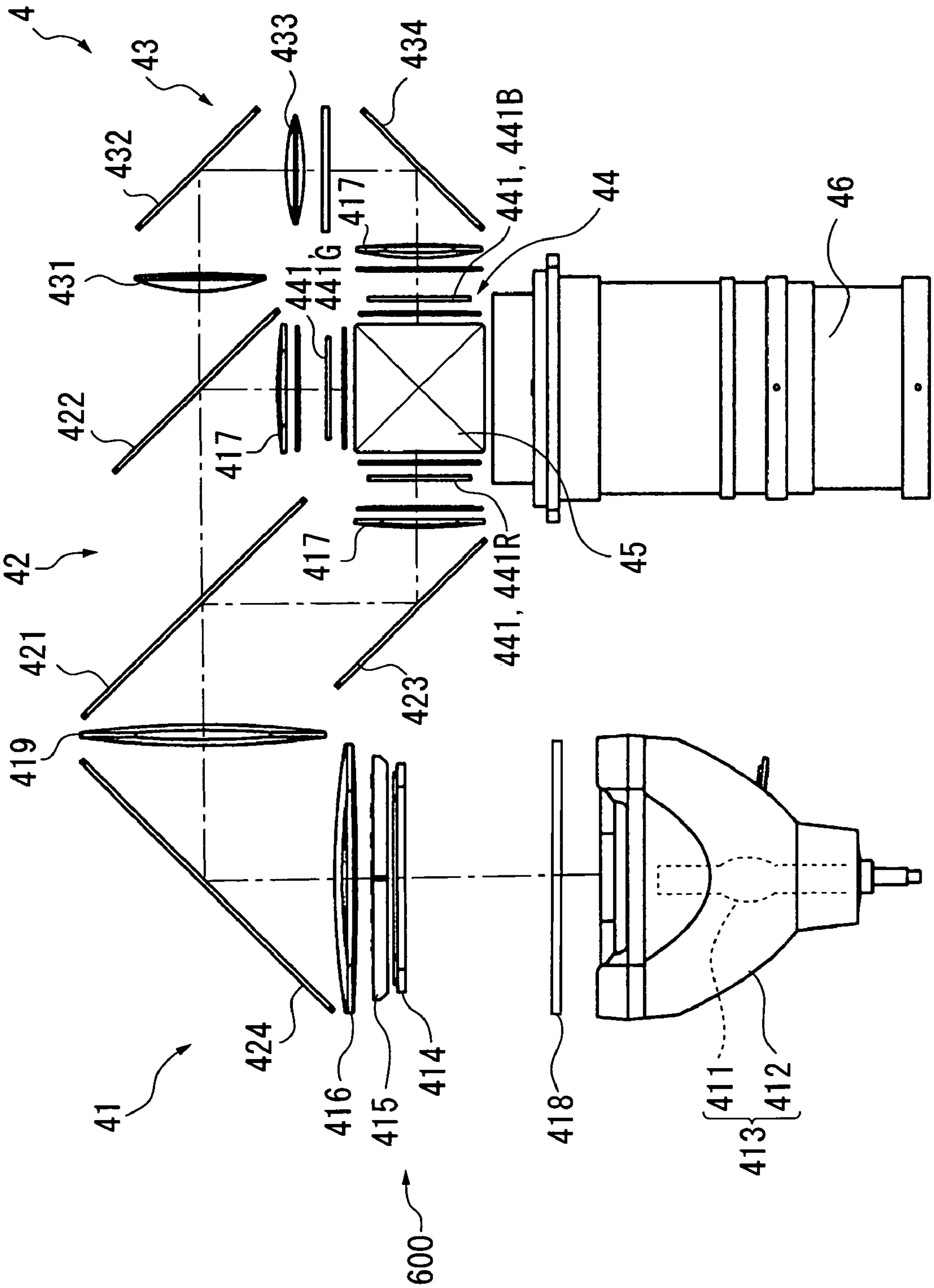
FIG. 6 is a top view schematically showing the optical unit in the above-described embodiment.
Figure 12:
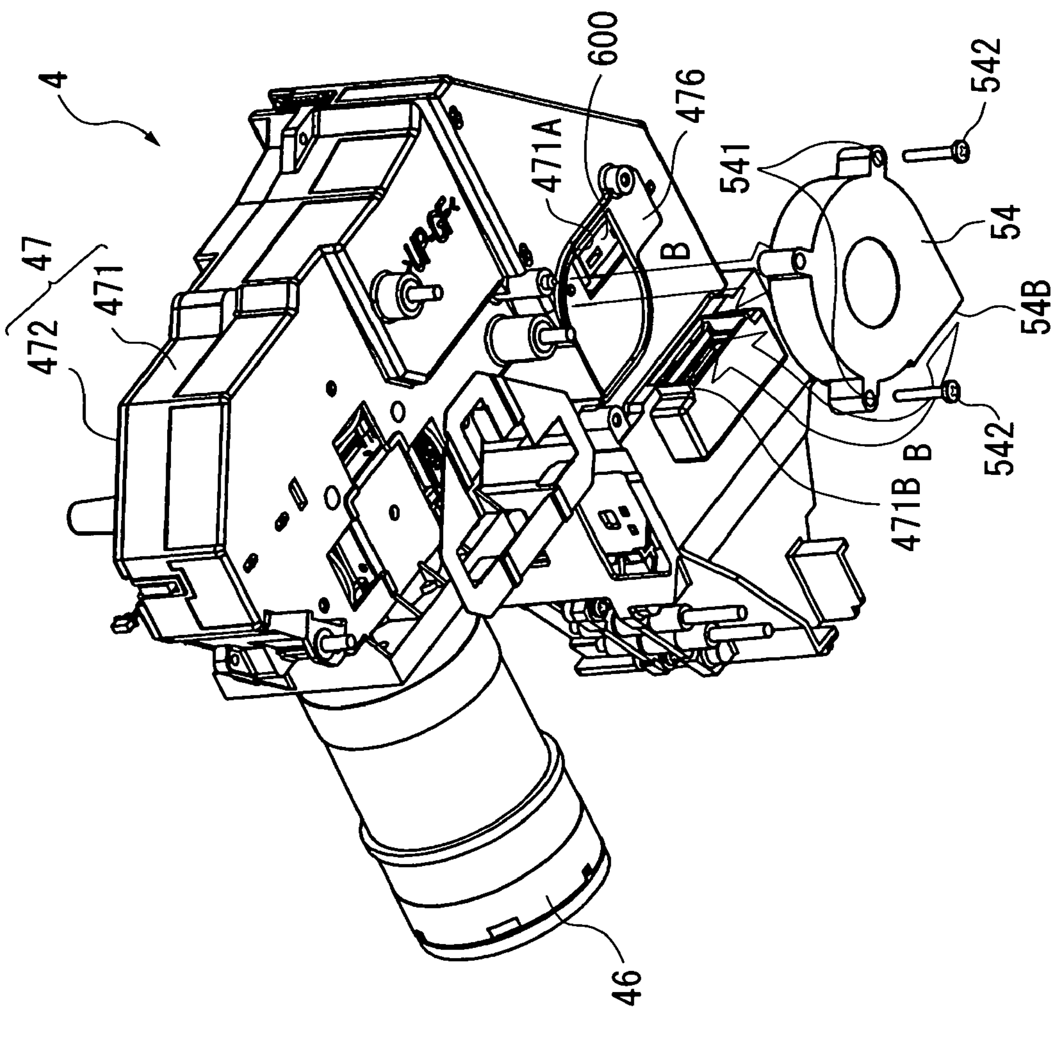
FIG. 12 is a perspective view seen from below of the optical unit in the above-described embodiment.

The optical unit 4, as shown in FIGS. 4, 6, 12, is an unit for optically processing a light beam emitted from the light source lamp 411 and forming an optical image corresponding to image information, and comprises an integrator illumination optical system 41, a color separation optical system 42, a relay optical system 43, an electro optic device 44, a cross dichroic prism 45 (FIG. 6) as a color synthesizing optical system and a projection lens 46 as a projection optical system.

These power source unit 3 and optical unit 4 are covered with a shield plate 80 (FIGS. 3, 5) made of aluminum, which surrounds the periphery including the top and bottom and, by this shield plate, a leakage of electromagnetic noises from the power source unit 3 and the like to the outside is prevented.

(2. Detailed Structure of the Optical System)

In FIGS. 4, 6, the integrator illumination optical system 41 is an optical system for almost uniformly illuminating image forming areas of three pieces of the liquid crystal panels 441 (denote the liquid crystal panels 441R, 441G, 441B for each color light of Red, Green, Blue) which constitute the electro optic device 44, and comprises a light source device 413, a first lens array 418, a second lens array 414 including an UV filter, a polarizing conversion element 415, a first condenser lens 416, a reflecting mirror 424 and a second condenser lens 419.

The light source device 413 has a light source lamp 411 as a radial light source emitting a radial light ray and a reflector 412 for aligning and emitting the radial light emitted from this light source lamp 411. As the light source lamp 411, a halogen lamp, a metal halide lamp or a high pressure mercury lamp are frequently used. As the reflector 412, a parabolic mirror is used. In addition to the parabolic mirror, a parallelized lens (a concave lens) may be used together with an ellipsoidal mirror.

Note that the light source device 413 will be described in detail later.

The first lens array 418 has a constitution in which small lenses having approximately a rectangular profile seen from an optical axial direction are placed in a matrix shape. Each small lens divides the light beam emitted from the light source lamp 411 into a plurality of sub beams. The profile shape of each lens is set so as to resemble approximately the same shape as the shape of the image forming area of the liquid crystal panel 441. For example, if an aspect ratio (a ratio of horizontal and vertical dimensions) of the image forming area of the liquid crystal panel 441 is 4:3, then the aspect ratio of each small lens is also set to 4:3.

The second lens array 414 has approximately the same constitution as that of the first lens array 418, and has the constitution in which the small lenses are placed in a shape of a matrix. This second lens array 414 has a function of image-forming an image of each small lens of the first lens array 418 on the liquid crystal panel 441 in conjunction with the first condenser lens 416 and the second condenser lens 419.

The polarizing conversion element 415 is arranged between the second lens array 414 and the first condenser lens 416, and at the same time constitutes an optical element unit 600 which is integrally unitized with the second lens array 414.

Such polarizing conversion element 415 converts the light from the second lens array 414 into one kind of a polarized light ray, thereby increasing the use efficiency of the light by the electro optic device 44.

Specifically, each partial light converted into one kind of the polarized light by the polarizing conversion element 415 is finally superposed approximately on the liquid crystal panels 441R, 441G, 441B of the electro optic device 44 by the first condenser lens 416 and the second condenser lens 419. Since the projector 1 (the electro optic device 44) of the present embodiment using the liquid crystal panel 441 of the type which modulates the polarized light can use only one kind of the polarized light, approximately half of the light from the light source lamp 411 which emits other kinds of random polarized lights is not used.

Hence, by using the polarizing conversion element 415, all the emitted light from the light source lamp 411 is converted into one kind of the polarized light, thereby increasing the use efficiency of the light by the electro optic device 44. Note that such polarizing conversion element 415 is introduced, for example, in Japanese Patent Laid-Open No. 8-304739.

Note that, similarly as the light source device 413, the optical element unit 600 including the polarizing conversion element 415 and the second lens array 414 will be described more in detail later.

The color separation optical system 42 comprises two pieces of the dichroic mirrors 421, 422 and the reflecting mirror 423, and has a function of separating a plurality of sub beams emitted from the integrator illumination optical system 41 into color lights of three colors of Red, Green, Blue by the dichroic mirrors 421, 422.

The relay optical system 43 comprises an incident side lens 431; a relay lens 433; and reflecting mirrors 432, 434, and has a function of guiding a color light, a blue color light from among the color lights separated by the color separation optical system 42 to the liquid crystal panel 441B.

At this time, in the dichroic mirror 421 of the color separation optical system 42, a blue color light component and a green color light component of the light beams emitted from the integrator illumination optical system 41 are permeated, and at the same time a red color light component is reflected. The red color light reflected by the dichroic mirror 421 is reflected by the reflecting mirror 423, and reaches the liquid crystal panel 441R for the red color by passing through a field lens 417. This field lens 417 converts each sub beam emitted from the second lens array 414 into a light beam parallel with its center axis (primary light ray). The same is applied to the field lenses 417 provided at the light incident side of the other liquid crystal panels 441G, 441B.

From among the blue color light and the green color light which permeate the dichroic mirror 421, the green color light is reflected by the dichroic mirror 422 and reaches the liquid crystal panel 441G for the green color by passing through the field lens 417. On the other hand, the blue color light permeates the dichroic mirror 422 so as to pass through the relay optical system 43 and, further, passes through the field lens 417 so as to reach the liquid crystal panel 441B for the blue light color. Note that the reason why the relay optical system 43 is used for the blue color light is because, since the length of the optical path of the blue color light is longer than the length of the optical path of other color lights, the deterioration of the use efficiency of the light caused by the diffusion of the light and the like is prevented. That is, this is because the sub beam incident on the incident side lens 431 is transmitted to the field lens 417 as it is.

The electro optic device 44 comprises three pieces of the liquid crystal panels 441R, 441G, 441B as an optical modulator, and these panels use, for example, a polysilicon TFT as s switching element, and each color light separated by the color separation optical system 42 is modulated according to image information by these three pieces of the liquid crystal panels 441R, 441G, 441B to form an optical image.

The cross dichroic prism 45 forms a color image by synthesizing a modulated image for each color light emitted from three pieces of the liquid crystal panels 441R, 441G, 441B. Note that the cross dichroic prism 45 is formed with a dielectric multi-layer film 45 reflecting the red color light and a dielectric multi-layer film reflecting the blue color light along four interfaces of the rectangular prism approximately in a X-shape, and three color lights are synthesized by these dielectric multi-layers films. The color image synthesized by the cross dichroic prism 45 is emitted from the projection lens 46 and projected and magnified onto the screen.

Each of the above-described optical systems 41 to 45, as shown in FIGS. 4, 12, is housed in the interior of an internal housing 47 made of synthetic resin as the optical part housing.

This internal housing 47 is constituted by a lower internal housing 471 provided respectively with groove portions in which each of the above-described optical elements 414 to 419, 421 to 423, 431 to 434 is inserted respectively from above by a sliding system and a cover-shaped upper internal housing 472 which closes an upper portion opening side of the lower internal housing 471.

Further, the light emitting side of the internal housing 47 is formed with a head portion 49. The forward side of the head portion 49 is fixed with the projection lens 46, and the rear side is fixed with the cross dichroic prism 45 on which the liquid crystal panels 441R, 441G, 441B are mounted.

Subsequently, structures of the light source device 413, the optical element unit 600 and the internal housing 47 in the vicinity thereof which constitute an essential portion of the present invention will be described and, then, a cooling structure, particularly an optical element light source cooling system B will be described in detail.

[3. Structure of the Light Source Device]

Figure 7:
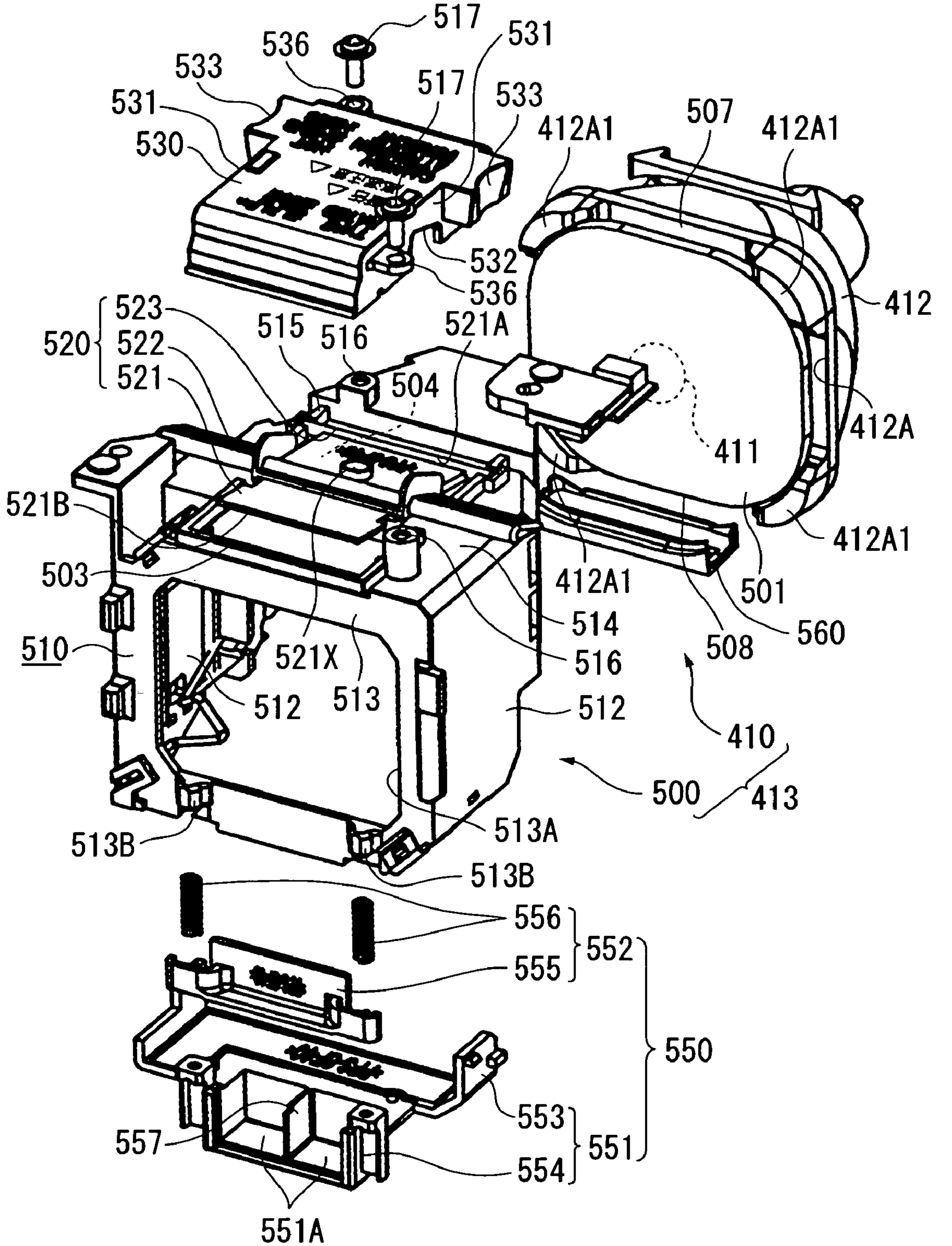
FIG. 7 is an exploded perspective view showing a light source device in the above-described embodiment.
Figure 8A:
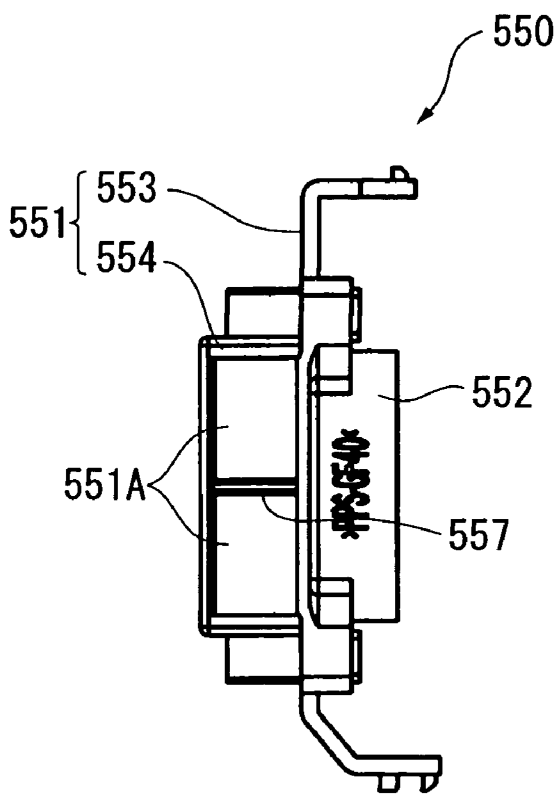
FIG. 8 is a view seen from above or from the front side of a duct frame in the above-described embodiment.
Figure 8B:
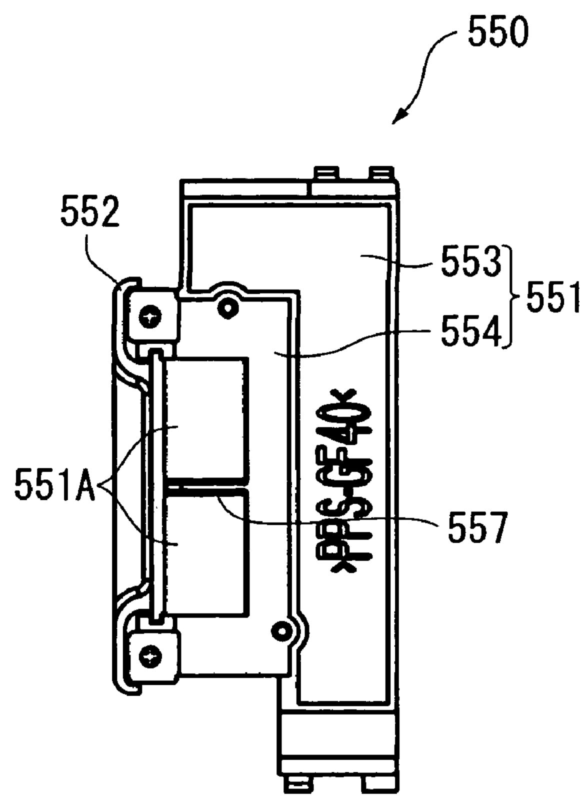

FIG. 7 is an exploded perspective view showing the light source device 413, and FIG. 8 is a view of a suction side duct frame 550 constituting the light source device 413 seen either from above or from the front side.

The light source device 413 is, as explained above, a device for emitting a predetermined light beam, and as shown in FIG. 7 in addition to FIGS. 4, 6, is constituted by comprising a lamp main body 410 having a light source lamp 411 and a reflector 412 and a light source lamp housing 500 for housing this lamp main body 410, and is detachably attachable to the internal housing 47 (see FIG. 4).

From here, the light source device 413 will be described by using FIG. 7. A light emitting surface 412A, which is the front surface of the reflector 412, is formed with protrusion pieces 412A1 protruding frontward at its four corners respectively. These four protrusion pieces 412A1 are fitted with a transparent plate 501 made of glass, plastic and the like spaced apart at a predetermined interval so as to cover the light emitting surface 412A. Since the front surface portion of the reflector 412 has such a structure, approximately a rectangular opening portion having approximately the same size as the protruded size of the protrusion piece 412A1 in its one side is formed in four pieces at the upper and lower sides and the left and right sides of the light emitting surface 412A between the light emitting surface 412A and the transparent plate 501 (the illustration thereof is partially omitted).

From among these four opening portions, the opening portion formed at the upper side and the opening portion formed at the underside constitute a pair of lamp cooling opening portions in the projector according to the present invention, and the opening portion formed at the upper side is an exhaust side opening portion 507, and the opening portion formed at the underside is a suction side opening portion 508.

For this reason, the positions of the exhaust side opening portion 507 and the suction side opening portion 508 are symmetrical with the optical axis of the light beam emitted from the light source lamp 411 as a center.

Further, the exhaust side opening portion 507 and the suction side opening portion 508 are provided with dust proof filters, the illustration of which is omitted, so that, when the light source lamp 411 is broken, the broken fragments thereof are prevented from flying out.

Note that, from among the four opening portions, the opening portions formed at the left and right sides are abutted against the side surface portions 512 of the light source lamp housing 500 so as to be closed by these side surface portions 512 when the light source device 413 is assembled by a lamp main body 410 and the light source lamp housing 500.

Because of such a structure, the lamp main body 410 is formed with a light source cooling air flow channel X as a distribution channel of the air which flows from the external side to the internal side of the lamp main body 410 through the suction side opening portion 508, and further, from the internal side to the exterior side of the lamp main body 410 through the exhaust side opening portion 507. In this way, it is possible to cool the internal side of the lamp main body 410 including the light source lamp 411 (see FIG. 14).

On the other hand, the light source lamp housing 500 is a member for housing and protecting the lamp main body 410, and at the same time for positioning and fixing the lamp main body 410 including the light source lamp 411 and the reflector 412 to the optical axial direction of the light beam emitted from the light source lamp 411 as well as the direction orthogonal to this optical direction, and moreover for assisting in cooling the interior side of the light source lamp housing 500, and comprises a housing main body 510, an exhaust side lid member 520, an exhaust side duct frame 530 and a suction side duct frame 550.

The housing main body 510 is a box-shaped member for performing the protection, positioning and fixing of the lamp main body 410, and is constituted by comprising two side surface portions 512 abutting against the left and right side portions in the lamp main body 410, a front surface portion 513 abutting against the front surface portions of four protrusion pieces 412A1 and an upper surface portion 514 abutting against the upper portion of the lamp main body 410.

The front surface portion 513 is formed with a front surface opening portion 513A for allowing the front surface of the transparent plate 501 to be exposed from the light source lamp housing 500 so that the light beam emitted from the light source lamp 411 is not inhibited.

In the upper surface portion 514, the front side of the housing main body 510 is formed with approximately a rectangular front side opening portion 503. Further, approximately a center portion of the upper surface portion 514 at the back side of this front side opening portion 503 is formed with approximately a square center opening portion 504 which is smaller in the length of one side than the long side of the front side opening portion 503. Note that, in FIG. 7, this center opening portion 504 is closed by the exhaust side lid member 520, so that it is hidden in the drawing.

Further, in the upper surface portion 514, the back side of the center opening portion 504 is formed with a support bearing 515 for mounting a support axis 523 of the exhaust side lid member 520 to be described later. Moreover, in the upper surface portion 514, positions such as to be made diagonal by pinching the center opening portion 504, that is, the positions in the left innermost and short of the right with the housing main body 510 seen from the front surface side are formed with a screw hole portion 516 respectively.

The front side opening portion 503 is formed such that its opening area is slightly larger than the exhaust side opening portion 507 provided in the lamp main body 410. Further, when the light source device 413 is assembled by the lamp main body 410 and the light source lamp housing 500, the front side opening portion 503 is allowed to come to the position where it is superposed on the exhaust side opening portion 507.

Note that, though the illustration is omitted, an elastic member comprising rubber, resin and the like is provided between the front side opening portion 503 and the exhaust side opening portion 507 so as to fasten these opening portions 503, 507. By this elastic member, even when the light source lamp 411 is broken, the broken fragments thereof are prevented from flying out.

The exhaust side lid member 520 is provided on the upper side of the upper surface portion 514 of the housing main body 510, and at the same time it is a member for closing and opening the front side opening portion 503 and the center opening portion 504 formed on the upper surface portion 514, and is constituted by comprising a tabular lid portion member main body 521 for closing the opening portions 503, 504, the support axis 523 for axially supporting this lid member main body 521 and an auxiliary plate 522 for assisting the rotation of the lid member main body 521.

The lid member main body 521 has approximately a rectangular shape with the length of a short side being approximately the same as that of a long side of the front side opening portion 503, and is formed to have a size completely to cover the opening portions 503, 504.

The auxiliary plate 522 is extended to both sides approximately from the center portion in the long side of the lid member main body 521 to the direction along the short side of the lid member main body 521, and its sectional profile has a down-turn shape.

The support axis 523 is mounted on a back end portion 521A of the lid member main body 521 and is supported by the support bearing 515 as described above.

Here, when the light source device 413 is assembled by the lamp main body 410 and the light source lamp housing 500, the auxiliary plate 522 abuts against a protrusion formed in the lower internal housing 471 (see FIGS. 4, 14), and by this abutment of the protrusion, the lid member main body 521 is rotated with the support axis 523 as a supporting point. In this way, a top end portion 521B of the lid member main body 521 is lifted.

Accordingly, in the case where the light source device 413 is mounted on the lower internal housing 471, the top end portion 521B of the lid member main body 521 is always put into a lifted state, so that the opening portions 503, 504 are always opened.

On the other hand, in the case where the light source device 413 is removed from the lower internal housing 471, the abutment by the protrusion is released, and the top end portion 521B of the lid member main body 521 is lowered, so that the opening portions 503, 504 are closed.

The exhaust side duct frame 530 is a box-shaped cover for covering the opening portions 503, 504 and the exhaust side lid member 520 to prevent the air flowing in the interior from leaking to the outside.

The interior of the exhaust side duct frame 530 is a cavity, and further, both side surfaces 531 of the exhaust side duct frame 530 are formed with notch portions 532 (the illustration of the one side is omitted) notched by corresponding to the position, shape and movement of the auxiliary plate 522 so that the movement of the exhaust side lid member 520 is not inhibited.

Further, the exhaust side duct frame 530 is formed with screw portions 536 at the position corresponding respectively to two screw hole portions 516 formed on the upper surface portion 514 of the housing main body 510. The screws 517 are inserted into the screw hole portions 516 and the screw portions 536 and screwed, so that the exhaust side duct frame 530 is fixed to the housing main body 510.

Further, back portion sides of the notch portions 532 at both side faces 531 of the exhaust side duct frame 530 are formed with hand hold portions 533 having a concavity corresponding to the ball of a finger, so that the light source device 413 is easy to be removed from the lower internal housing 471.

Note that, though hidden in FIG. 7, between the exhaust side duct frame 530 and the exhaust side lid member 520, there is provided a coil spring for energizing the lid member main body 521 to the housing main body 510 side by abutting against an abutting portion 521X formed on the lid member main body 521.

Next, the suction side duct frame 550 is a member which is arranged at the underside of the housing main body 510 and covers the suction side opening portion 508 of the lamp main body 410 from the underside, and is constituted by comprising a suction side duct frame main body 551 for guiding the air exhausted from the Sirocco fan 54 to the suction side opening portion 508 and a shutter 552 for performing an opening and closing of an opening portion 551A formed in the suction side duct frame main body 551.

The suction side duct frame main body 551, as shown in FIGS. 8(A), (B), is constituted by comprising a tabular member 553, which abuts against the underside of the lamp main body 410 and is concave in the front side, and an air intake portion 554, which has a top end center of this tabular member 553 extended in an out-of-plane direction.

Further, the center portion of the air intake portion 554 is formed with a tabular rectifying plate 557 for rectifying the air exhausted from the Sirocco fan 54, and this rectifying plate 557 divides the air intake portion 554 into two spaces. Through the opening portion 551A formed in the top end of this air intake portion 554, the air exhausted from the Sirocco fan 54 is guided to the lamp main body 410.

Here, since the air exhausted from the Sirocco fan 54 flows along a rotational tangent line of the fan, it does not come out vertically to an exhaust port 54B, but comes out slightly eccentric to a rotational direction side. For this reason, the center portion of the air intake portion 554 is provided with the rectifying plate 557 such that the air coming out eccentrically from the exhaust port 54B hits against the rectifying plate 557 and turns around so as to be rectified.

Note that, though the rectifying plate 557 is formed in the center portion of the air intake portion 554 only by a factor of one piece, it will be appreciated that the number to be formed and the position thereof are not particularly limited.

The shutter 552 is constituted by comprising a shutter main body 555 slidably supported with the housing main body 510 and two coil springs 556 for energizing this shutter main body 555 to the sliding direction, that is, the downward direction in the drawing.

The shutter main body 555 is an approximately rectangular-shaped plate formed so as to cover the opening portion 551A.

The two coil springs 556 have one end thereof mounted to the shutter 552, and at the same time have the other end inserted into and fixed to a concave portion 513B formed at the underside of the front side opening portion 513A respectively in the front surface portion 513 of the housing main body 510.

Here, between the reflector 412 and the transparent plate 501 which constitute the light source lamp 413, there is s duct cap 560 arranged as shown in FIG. 7.

Figure 9:
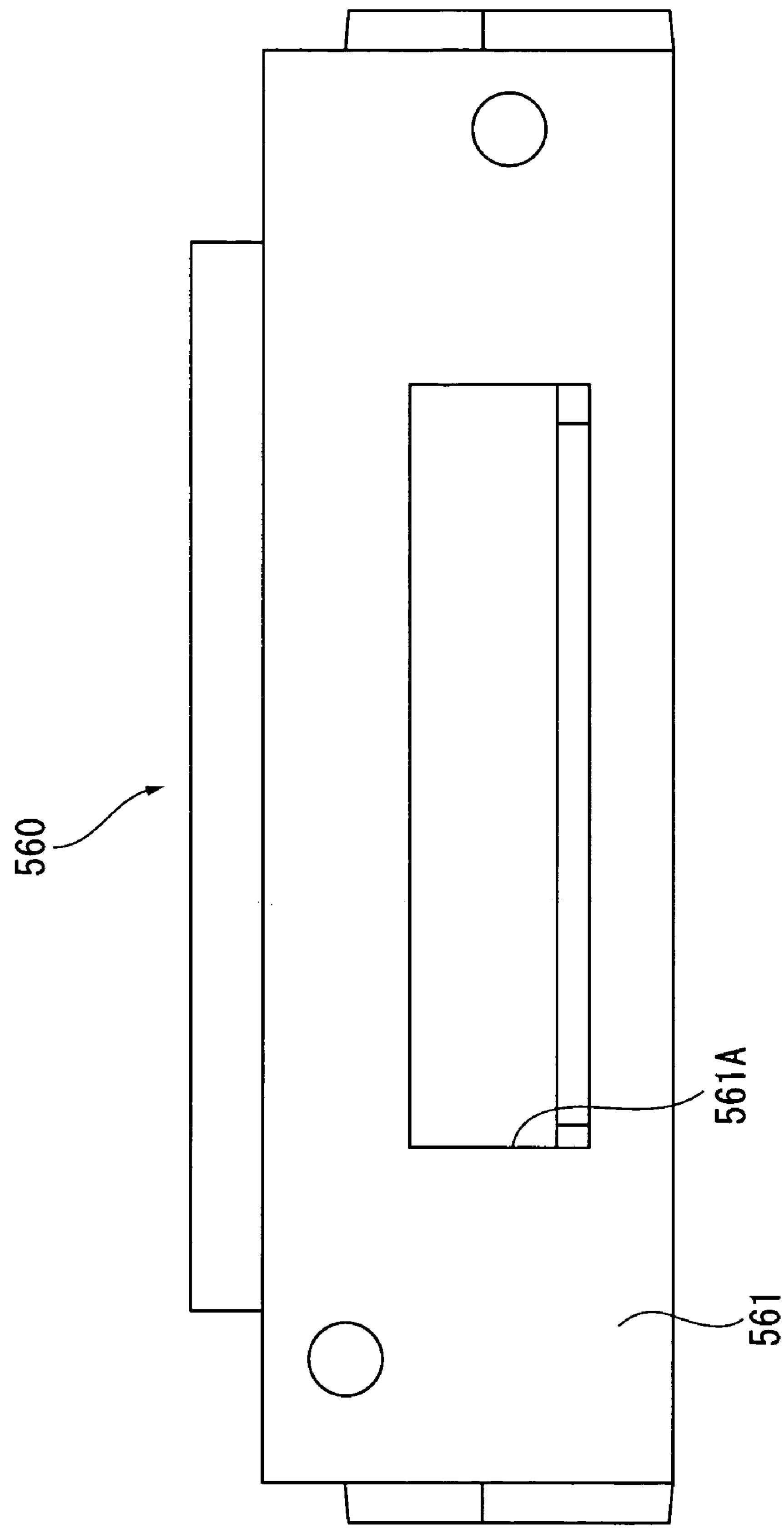
FIG. 9 is a view seen from below of a duct cap in the above-described embodiment.
Figure 10:
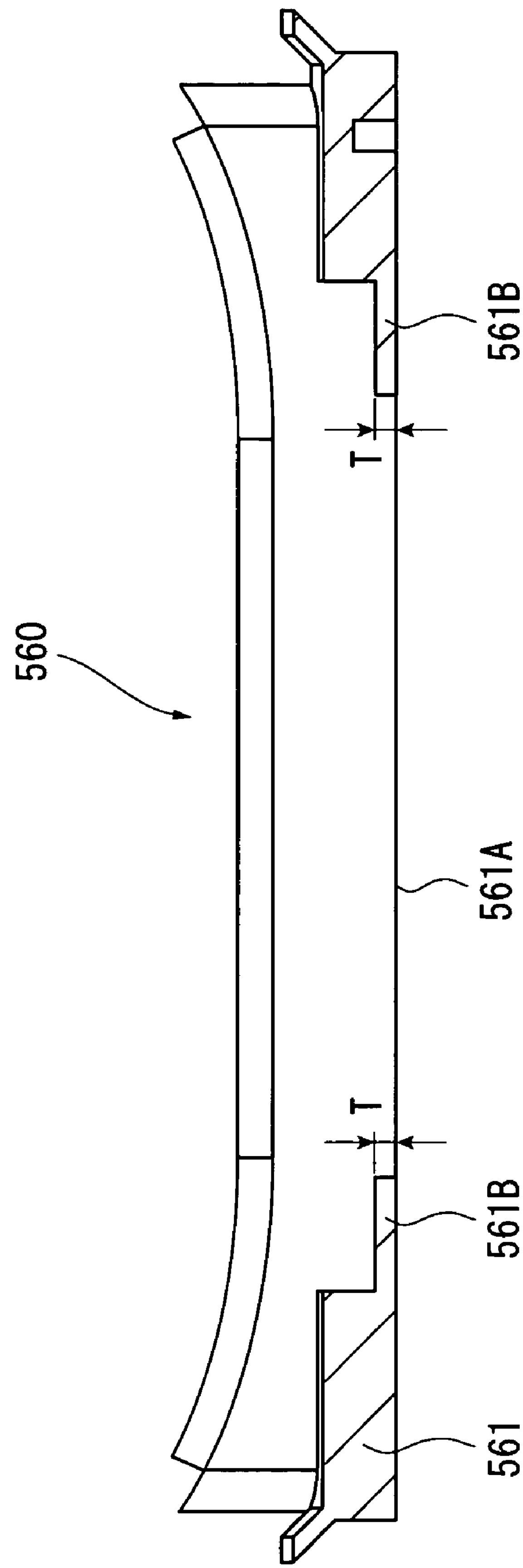
FIG. 10 is a sectional view of the duct cap in the above-described embodiment.

The duct cap 560, as shown in FIGS. 9, 10, supports the underside of the lamp main body 410, and at the same time it is a member for effectively circulating the cooling air flowing from the Sirocco fan 54 into the interior of the reflector 412, and its upper side is bent according to the shape of the transparent plate 501, and its longitudinal thickness size is approximately the same as the protruded size of the four protrusion pieces 412A.

Further, as shown in FIG. 9, the bottom face portion 561 of the duct cap 560 is formed with a suction opening potion 561A approximately at its center. As shown in FIG. 10, in the bottom face portion 561, a peripheral portion of the suction opening portion 561A is smaller (thinner) in the thickness size in contrast to the other portion. That is, the bottom face portion 561 is formed with extended portions 561B extending from this other portion to the center side of the suction opening portion 561A. The thickness size T of this extended portion 561B is not larger than about 0.5 mm and is thinner than the other portion.

Figure 14:
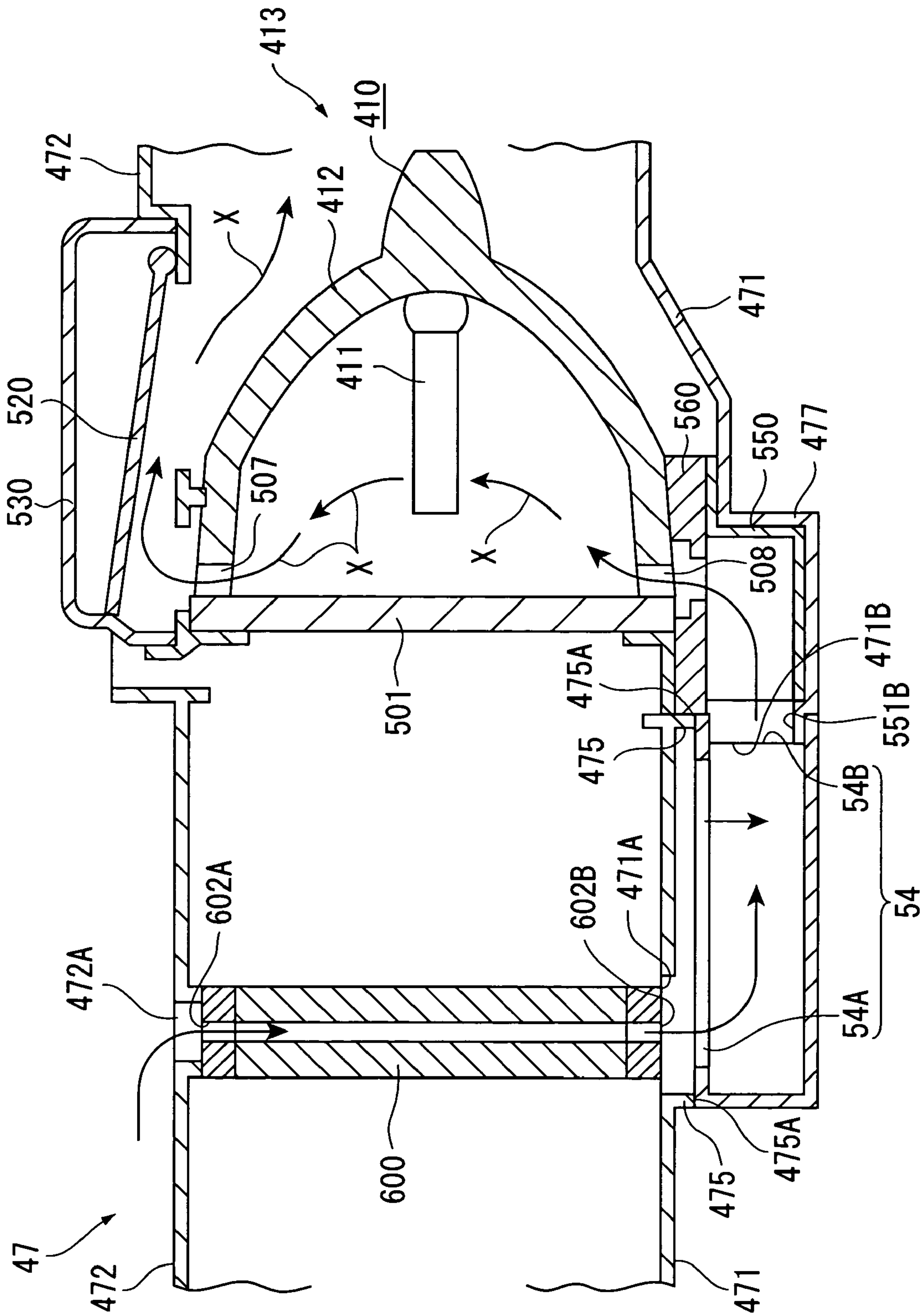
FIG. 14 is a view schematically showing an essential portion of the optical unit in the above-described embodiment.

The peripheral portion of the suction opening portion 561A of the bottom face portion 561 is formed thinner in this way, so that the cooling air flowing from the Sirocco fan 54 side enters smoothly the interior of the reflector 412 as if it flows along the transparent plate 501, thereby effectively cooling the top end portion of the light source lamp 411 (see FIG. 14).

Here, when the light source device 413 is assembled by the lamp main body 410 and the light source lamp housing 500, the protrusion (the illustration is omitted) formed in the lower internal housing 471 (see FIG. 4) is formed such that it abuts against the light source device 413 so as to lift the shatter main body 555.

Accordingly, in the case where the light source device 413 is mounted on the lower internal housing 471, the shutter main body 555 is always in a lifted state, and the opening portion 551A is always opened. On the other hand, in the case where the light source device 413 is removed from the lower internal housing 471, the abutment by this protrusion is removed so that the shutter main body 555 is lowered and the opening portion 551A is closed.

When the light source device 413 is removed from the lower internal housing 471 in this way, since both of the exhaust side opening portions 503, 504 and the suction side opening portion 551A are closed together, the opening portions 507, 508 as a pair of lamp cooling opening portions which are the interior sides of these opening portions 503, 504, 551A are also closed, and the opening and closing mechanism constituting the present invention is closed.

[4. Structure of the Optical Element Unit]

Here, the structure of the optical element unit 600 will be described.

Figure 11:
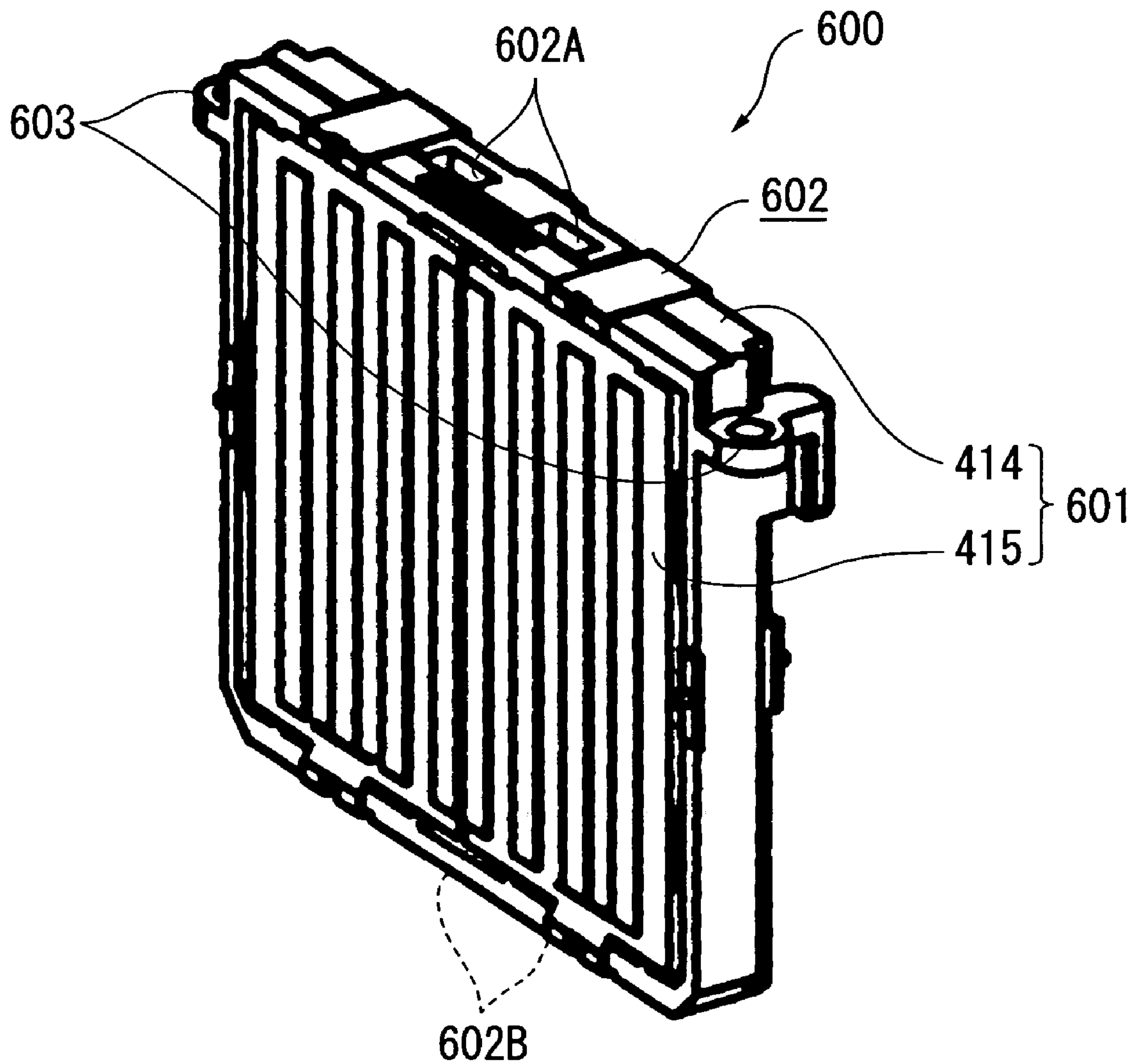
FIG. 11 is a perspective view showing an optical element unit in the above-described embodiment.

FIG. 11 is a perspective view showing the optical element unit 600.

The optical element unit 600, as described above, is arranged between the first condenser lens 416 and the first lens array 418, and at the same time it is integrally unitized with the polarizing conversion element 415 and the second lens array 414.

More specifically, the optical element unit 600, as shown in FIG. 11, is constituted by comprising the polarizing conversion element 415 and the second lens array 414, which are optical element 601, and an optical element fixing member 602 which fix these optical elements 601.

The optical element fixing member 602 is a member fixed between the polarizing conversion element 415 and the second lens array 414 with a predetermined space being maintained in-between, and in such a state, is fixed at a predetermined position of the lower internal housing 471 (see FIG. 4) by screws 610. Note that the optical element fixing member 602 is formed with one piece each of the screw hole portion 603 to insert the screws 610 on the upper side of both of the left and right end portions, which are the portion to show the thickness of the optical element fixing member 602.

Further, the optical element fixing member 602 is formed with a cooling air flow channel which pierces upward and downward directions in the drawing by using the space provided between the polarizing conversion element 415 and the second lens array 414 in order to cool these polarizing conversion element 415 and second lens array 414. In this way, the upper side of the optical element unit 600 is formed with two approximately rectangular suction side opening portions 602A to constitute the cooling air flow channels. On the other hand, though hidden in this drawing, the underside of the optical element unit 600 is also formed with two approximately rectangular exhaust side opening portions 602B to constitute the cooling air flow channel (see FIG. 13).

Accordingly, by such cooling air flow channels, the air existing over the optical element unit 600 enters between the polarizing conversion element 415 and the second lens array 414 from the suction side opening portion 602A and comes out from the exhaust side opening portion 602B so as to cool the optical element 601 which is the polarizing conversion element 415 and the second lens array 414.

[5. Structure of the Internal Housing]

Next, the structure of the internal housing 47 in the vicinity of the optical element unit 600 and in the vicinity of the suction side duct frame 550 will be described.

First, the structure of the internal housing 47 in the vicinity of the optical element unit 600 will be described.

As shown in FIG. 14, in the upper internal housing 472, the portion which is above the optical element unit 600 is formed with an optical element cooling suction side opening portion 472A for allowing the cooling air to pass through according to the layout of the optical element unit 600. Further, as shown in FIGS. 12, 13, in the lower internal housing 471, the portion which is below the optical element unit 600 (above in FIG. 13) is formed with an optical element cooling exhaust side opening portion 471A.

Figure 13:
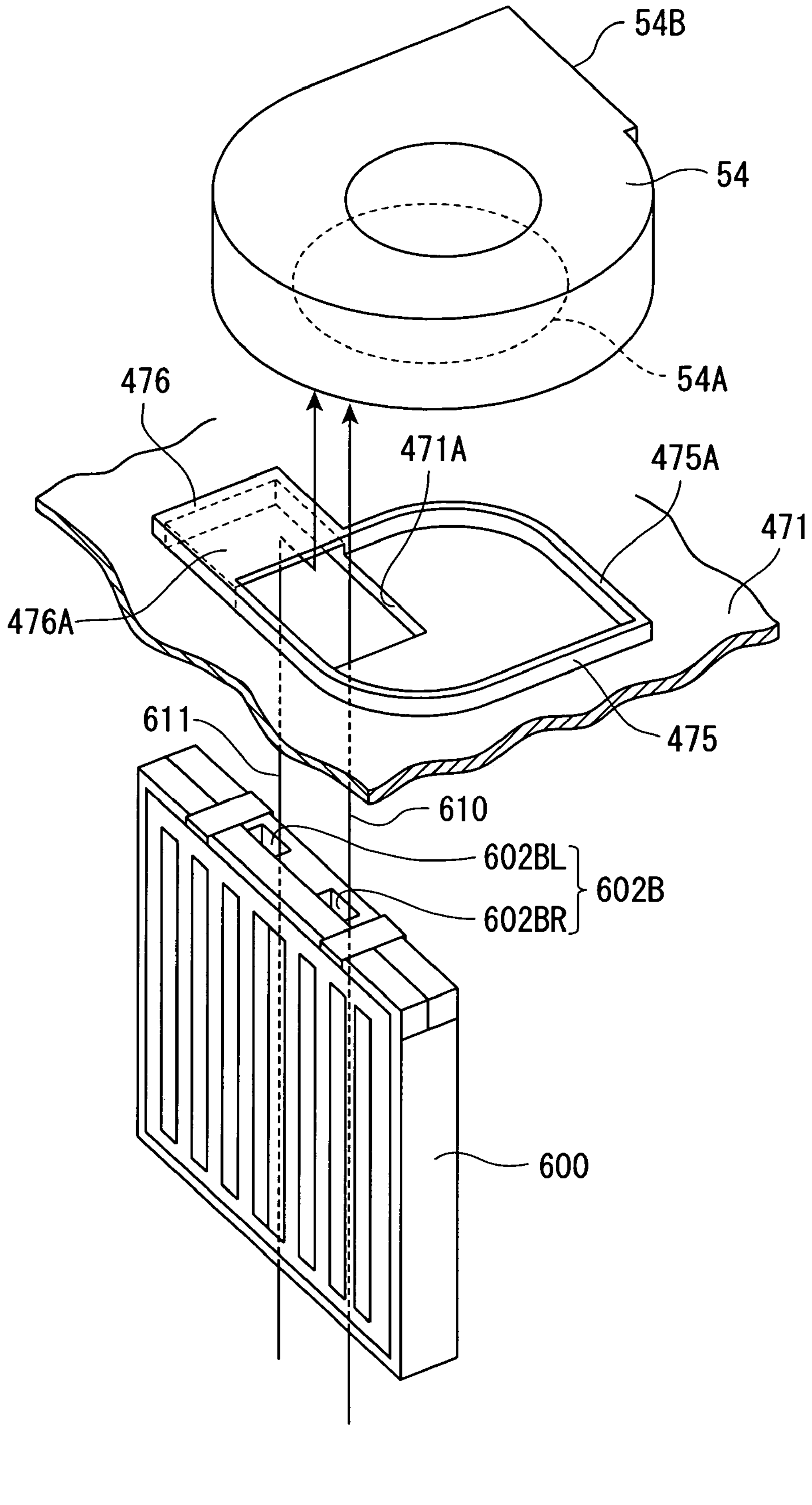
FIG. 13 is a perspective view showing an enlarged portion of a lower internal housing in the above-described embodiment.

Further, as shown in FIG. 13, the external surface (upper side in the drawing) of the lower internal housing 471 is formed with a rib-shaped protrusion 475, which has a shape to surround the optical element cooling exhaust side opening portion 471A and at the same time to surround a suction port 54A of the Sirocco fan 54. The top end portion 475A of this protrusion 475 accurately abuts against the Sirocco fan 54, and is formed in the shape of a flat surface so that the air from the outside does not flow inside. By this protrusion 475, there is provided a space having a protruded size portion of the protrusion 475 between the suction port 54A of the Sirocco fan 54 and the optical element cooling exhaust side opening portion 471A.

Further, in the vicinity of the optical element cooling exhaust side opening portion 471A, the internal surface (underside in the drawing) of the lower internal housing 471 is formed with an air accumulator 476A consisting of a concave step portion 476. The external surface of this concave step portion 476 is located at the same height as that of the top end portion 475A of the protrusion 475 and is formed so as to accurately abut against the surface of the Sirocco fan 54 similarly as the top end portion 475A of the protrusion 475.

Since the lower internal housing 471 in the vicinity of the optical element unit 600 has such a constitution, as shown in FIG. 13, the air flowing out from the optical element unit 600 through the exhaust side opening portion 602B of the optical element unit 600 flows as indicated by arrow marks 610, 611 and is sucked by the Sirocco fan 54.

Specifically, in the optical element unit 600, the air flowing out from the exhaust side opening portion 602BR of the right side in FIG. 13 flows straightly to the suction port 54A of the Sirocco fan 54 as indicated by the arrow mark 610, and is sucked by the Sirocco fan 54.

On the other hand, the air flowing out from the exhaust side opening portion 602BL of the left side in the drawing 13 hits once against the interior surface of the concave step portion 476, and remains in the air accumulator 476A and, after that, while turning around, flows into the suction port 54A of the Sirocco fan 54, and is sucked by the Sirocco fan 54.

Note that, in FIGS. 13, 14, the left and right cooling balance of the optical element unit 600 can be freely changed by changing an opening area in the optical element cooling exhaust side opening portion 471A or a light source device side opening portion 471B.

Subsequently, the structure of the internal housing 47 in the vicinity of the suction side duct frame 550 will be described The lower internal housing 471 constituting the internal housing 47 houses the suction side duct frame 550, and at the same time is formed with an extended portion 477 extended from the external surface of the lower internal housing 471. This extended portion 477 has the light source device side opening portion 471B of its top end connected to the exhaust port 54B of the Sirocco fan 54, and at the same time is formed according to the shape of the air intake portion 554 in the suction side duct frame 550. The interior side of such suction side duct frame 550 is covered twice with the suction side duct frame 550 and the lower internal housing 471, so that the leaking of the cooling air flowing in the interior to the outside of the internal housing 47 is reliably prevented.

[6. Sirocco Fan]

Next, the Sirocco fan 54 will be described in detail.

FIG. 12 is a perspective view seen from below of the optical unit 4. Further, FIG. 13 is a perspective view of an enlarged portion of the optical unit 4, that is, the lower internal housing 471. Further, FIG. 14 is a view schematically showing an essential portion in the projector 1.

As shown in FIG. 12, the Sirocco fan 54 is a fan arranged at the underside of the lower internal housing 471, and is fixed to the external surface of the lower internal housing 471 by two screws 542 through screw hole portions 541.

Further, the Sirocco fan 54, as shown in FIGS. 5, 12, 13, 14, is a fan which is in the vicinity of the optical element unit 600 and sucks the air in the interior of the internal housing 47 so as to exhaust it at the light source device 413 side, and is constituted by comprising the suction port 54A directed to the optical element cooling exhaust side opening portion 471A and the exhaust port 54B connected to a light source cooling air flow channel X.

[7. Cooling Structure]

The projector 1 of the present embodiment having such a constitution as described above comprises a panel cooling system A for mainly cooling the liquid crystal panel 441R, 441G, 441B, an optical element light source cooling system B for mainly cooling the optical element unit 600 and the light source device 413 and a power source cooling system C for mainly cooling the power source 31.

Note that, since the optical element light source cooling system B is a cooling system, which is an essential portion of the present invention, it will be described in detail later. First, the panel cooling system A and the power source cooling system C will be described.

In FIGS. 2, 4, 5, the panel cooling system A uses a pair of Sirocco fans 51, 52 arranged at both sides of the projection lens 46. The cooling air sucked from the suction port 231B of the undersurface by the Sirocco fans 51, 52 cools the liquid crystal panel 441R, 441G, 441B from below to above and, after that, is shifted to the axial flow exhaust fan 53 side of the forward corner while cooling the undersurface of the driver board 90 (FIG. 3), and is exhausted from the exhaust port 212B of the front surface side.

In FIG. 4, the power source cooling system C uses the axial flow suction fan 55 provided in the backside of the power source 31. The cooling air sucked from the back surface side suction port 2D by the axial flow suction fan 55 cools the power source 31 and the lamp driving circuit 32 and, after that, is exhausted from the exhaust port 212B by the axial flow exhaust fan 53 similarly as the other cooling system A.

[8. Structure of the Optical Element Light Source Cooling System]

Next, the optical element light source cooling system B will be described in detail.

Similarly as the panel cooling system A, the cooling air sucked from the suction port 231B of the undersurface by the Sirocco fans 51, 52 cools the liquid crystal panels 441R, 441G, 441B from below to above and, after that, reaches the undersurface of the driver board 90 (FIG. 3). The part of the cooling air flows into the panel cooling system A, and the remainder of the cooling air is drawn by the Sirocco fan 54 as indicated by the arrow marks in the optical element light source cooling system B in FIG. 14 and, while cooling the driver board 90 not shown in FIG. 14, enters the interior of the internal housing 47 from the optical element cooling suction side opening portion 472A, which is arranged in opposition to the driver board 90 and at the same time formed in the upper internal housing 472.

The cooling air having entered the interior of the internal housing 47 enters the interior of the optical element unit 600 from the suction side opening portion 602A of the optical element unit 600, and passes through the channel indicated by the arrow marks 610, 611 in FIG. 13, and cools the polarizing conversion element 415 and the second lens array 414, and after that, comes out from the exhaust side opening portion 602B.

Next, referring to FIG. 12 also, the cooling air coming out from the exhaust side opening portion 602B comes outside of the internal housing 47 from the optical element cooling exhaust side opening portion 471A formed in the lower internal housing 471 and is sucked from the suction port 54A of the Sirocco fan 54 and is discharged from the exhaust port 54B.

This discharged cooling air enters the opening portion 551A formed on the top end of the air intake portion 554 of the suction side duct frame 550 and, while being rectified by the rectifying plate 557 (see FIG. 7) with its direction diverted 90 degrees along the suction side duct frame 550, enters the light source cooling air flow channel X through the suction side opening portion 508 of the lamp main body 410. After that, the cooling air passes through the light source cooling air flow channel X, and cools the light source lamp 411 and, after that, comes outside of the lamp main body 410 from the exhaust side opening portion 507, and is exhausted outside of the exterior case 2 from the exhaust port 212B by the axial flow exhaust fan 53 similarly as the cooling systems A, C.

[Advantages of the Present Embodiment]

According to the present embodiment as described above, the following advantages are available.

(1) Since the sirocco fan 54 is driven so that the cooling air flows similarly as the optical element light source cooling system B indicated by the arrow marks in FIG. 14, the optical element unit 600 and the light source lam 411 are concentratedly cooled. It is, therefore, possible to sufficiently cool the light source lamp 411 as well as the light source device 413 and the optical element unit 600.

(2) Since the cooling air which enters the interior side of the internal housing 47 at first is the most coolest among the cooling air in the optical element light source cooling system B, the upper part of the optical element unit 600 is formed with the optical element cooling side suction opening portion 472A so that the cooling air is allowed to enter there at first. Hence, the optical element unit 600 which is easy to suffer a distortion and the like can be more effectively cooled, thereby making it possible to attempt the prolonging of the life of the optical element unit 600.

(3) Since the exhaust port 54B of the Sirocco fan 54 and the suction side opening portion 508 are connected through the suction side duct frame 550, the leaking out of the cooling air exhausted from the Sirocco fan 54 to other portions can be reduced. For this reason, the cooling air exhausted from the Sirocco fan 54 can be reliably blown to the light source cooling air flow channel X, and the interior of the reflector 412, that is, the light source lamp 411 can be effectively cooled, thereby making it possible to attempt the prolonging of the life of the light source lamp 411.

(4) Since the suction side opening portion 508 and the exhaust side opening portion 507, which are a pair of lamp cooling opening portions, are formed at symmetrical positions with the optical axis of the reflector 412 as a center, the cooling air is distributed in the interior of the reflector 412 relatively in a wider range, thereby making it possible to cool the light source lamp 411 more effectively.

(5) Since there is provided the transparent plate 501 which closes the light emitting surface 412A of the reflector 412, when the light source lamp 411 is broken, it is possible to prevent the broken fragments from flying out.

(6) Since the suction side duct frame 550 is formed with the rectifying plate 557, the cooling air flowing in the interior of the suction side duct frame 550 is rectified by the rectifying plate 557 and flows smoothly into the light source cooling air flow channel X, thereby making it possible to cool the light source lamp 411 more effectively.

(7) Since the light source device 413 is constituted by the opening and closing mechanism including the exhaust side lid member 520 and the duct frame 550, even in the case where the replacement is required due to the breakage of the light source lamp 411, when the light source device 413 is removed from the internal housing 47, the lamp main body 410 is closed by the opening and closing mechanism and, therefore, the broken fragments and the like of the light source lamp 411 can be prevented from flying out in the interior of the internal housing 47. For this reason, the possibility of the broken fragments of the light source lamp 411 being adhered onto the user of the projector and inflicting physical injuries on him can be eliminated. Moreover, since the light source lamp housing 500 is provided with the duct frames 530, 550, it is possible also to prevent the flying out of the broken fragments when the reflector 412 and the light source lamp 411 located in the interior of the housing 500 are broken.

(8) Since the lower internal housing 471 is formed with the rib-shaped protrusion 475, between the optical element cooling exhaust side opening portion 471A and the suction port 54A of the Sirocco fan, there is provided a space having the protruded size portion of the protrusion 475. For this reason, the fan 54 sucks the cooling air thoroughly in the vicinity of the optical element unit 600, thereby making it possible to cool the whole of the optical element unit 600.

(9) Since the protrusion 475 surrounds the suction port 54A of the Sirocco fan 54 and the optical element cooling exhaust side opening portion 471A, the air flowing into the suction port 54A from the gap between the protrusion 475 and the Sirocco fan 54 can be reduced. For this reason, the Sirocco fan 54 sucks the cooling air reliably in the interior of the internal housing 47, thereby making it possible to cool the optical element unit 600 sufficiently.

(10) Since the structure is such that the top end portion 475A of the protrusion 475 is made into a flat surface so that the protrusion 475 and the suction port 54A of the Sirocco fan 54 can accurately abut against each other, the cooling air in the interior of the internal housing 47 can be more reliably sucked, thereby making it possible to reliably cool the optical element unit.

(11) Since the lower internal housing 471 is formed with the concave step portion 476 and provided with the air accumulator 476A, the Sirocco fan 54 can suck the cooling air thoroughly in the vicinity of the optical element unit 600, thereby making it possible to cool the whole of the optical element unit 600.

(12) Since the driver board 90 is arranged in opposition to the vicinity of the optical element cooling suction side opening portion 472A, when the cooling air at the external side of the internal housing 47 flows into the interior side of the internal housing 47 through the optical element cooling suction side opening portion 472A, it also cools the driver board 90. For this reason, the driver board 90 including the circuit element which is weak to heat can be cooled, thereby making it possible to reliably operate the electro optic device 44 as well as the projector 1.

(13) Since the cooling air is allowed to flow into the back face side of the reflector 412 by the exhaust side lid member 520, electrodes of the light source lamp 411 which are usually located at the back face of the reflector 412 and tend to generate heat are cooled, thereby making it possible to attempt the prolonging of the life of the light source lamp 411 much more.

(14) Since the space at the interior side of the suction side duct frame 550 is covered twice by the suction side duct frame 550 and the lower internal housing 471, it is possible to reliably prevent the cooling air flowing in this interior from leaking and flowing to the outside of the internal housing 47.

(15) Since the opening and closing of the opening portions 503, 504, 551A is performed by the energizing of the coil springs, it is possible to provide the opening and closing mechanism of a simple structure.

MODIFIED EXAMPLES

Note that the present invention is not limited to the above described embodiment, but includes other constitutions and the like, and modifications and the like shown below are also included in the present invention.

For example, in the above-described embodiment, though the driver board 90 is arranged in opposition to the optical element cooling suction side opening portion 472A, if it can be reliably cooled by other cooling systems, it may be not placed particularly at this position.

Further, in the above-described embodiment, though a pair of lamp cooling opening portions 507, 508 is formed at symmetrical positions with the optical axis of the reflector 412 as a center, the pair may be shifted from the symmetrical positions, that is, the light source device 413 including the reflector 412 may be formed with a pair of opening portions. Further, the lamp cooling opening portions 507, 508 may be not provided by one piece each. For example, even when the suction side opening portion is only one piece, the structure may be such that two exhaust side opening portions are available. In short, at least a pair of opening portions may be provided.

Further, as the suction side duct frame 550, for example, a duct such as a flexible pipe and the like may be used so as to connect the exhaust port 54B of the Sirocco fan 54 and the light source cooling air flow channel X.

Here, in the above-described embodiment, though the light source device 413 is constituted by comprising the duct frames 530, 550 and the exhaust side lid member 520, if the light source lamp 411 can be reliably cooled, part of these elements may be provided or all of them may be not provided. However, the above-described embodiment has the better advantage in that the light source device 413 can be reliably cooled.

Furthermore, in the above-described embodiment, though the opening and closing mechanism is provided in the light source device 413, it may be not provided if not particularly necessary. Moreover, the opening and closing mechanism may be such that the suction side only at the underside of the light source device 413 is opened and closed. In such a case, since the broken fragments fall downward at the time of the breaking, if the underside only can be opened and closed, the mechanism has an advantage in that the broken fragments can be relatively reliably prevented from flying out. However, in contrast to whichever case it is, the above-described embodiment has the better advantage in that the broken fragments will not fly out definitely at the time when the light source lamp 411 is broken.

In the above-described embodiment, though the lower internal housing 471 is formed with the protrusion 475, if the Sirocco fan 54 effectively reliably sucks the cooling air, the protrusion may be not particularly provided. However, the above-described embodiment has the better advantage in that the cooling air in the vicinity of the optical element unit 600 can be thoroughly sucked.

In the above-described embodiment, though the lower internal housing 471 is formed with the air accumulator 476A consisting of the concave step portion 476, if the Sirocco fan 54 reliably effectively sucks the cooling air, the accumulator may be not particularly provided. However, the above-described embodiment has the better advantage in that the cooling air in the vicinity of the optical element unit 600 can be thoroughly sucked.

Further, in the above-described embodiment, though the upper and lower sides of the optical element fixing member 602 are formed with two pieces each of the opening portion 602A, 602B in order to cool the optical element unit 600, the number and shape thereof are not particularly limited. Further, the directions of the cooling air flow channels in the optical element unit 600 are also not limited to the upper and lower directions, but may be other directions such as an oblique direction and the like.

Further, in the above-described embodiment, though the embodiment is constituted such that the optical element unit 600 unitizing the polarizing conversion element 415 and the second lens array 414 is cooled, it is not limited to this, but may be constituted such that other optical elements, for example, such as the first condenser lens 416, the first lens array 418 and the like are cooled.

Figure 15:
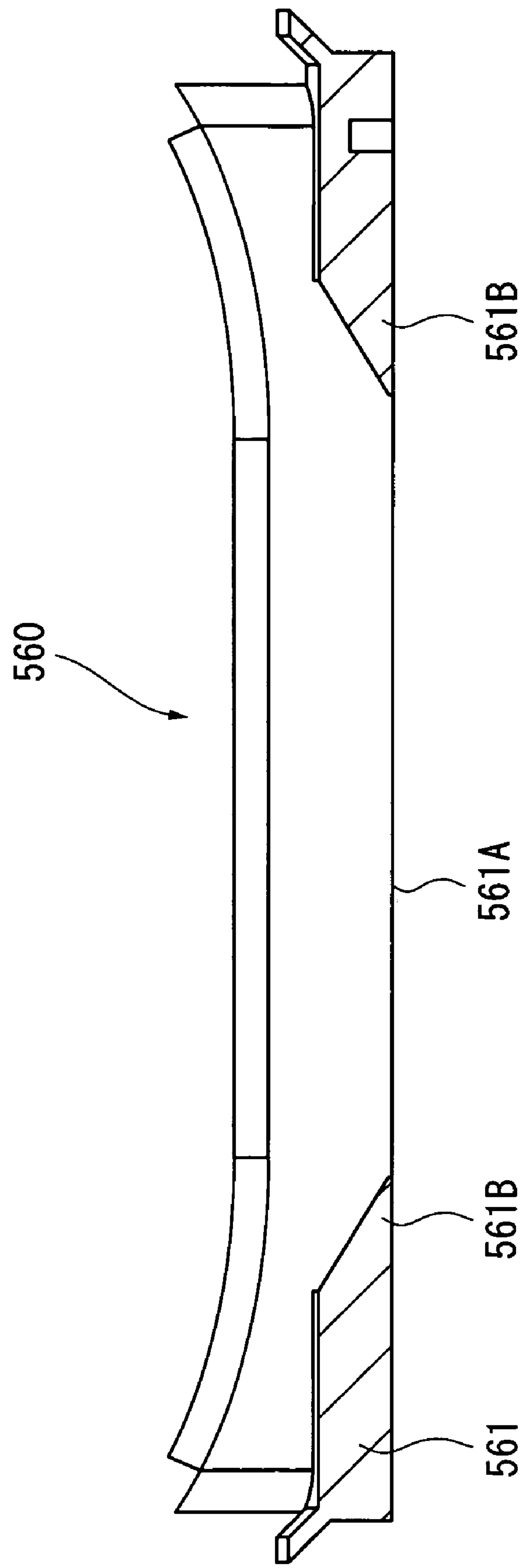
FIG. 15 is a sectional view showing a modified example of the duct cap in the above-described embodiment.

Note that, in the present embodiment, though the bottom face portion 561 of the duct cap 560 is formed with the thin extended portion 561B extending from other portion to the center side of the suction opening portion 561A, this extended portion 561B, as shown in FIG. 15, may be taper-shaped so as to gradually become smaller in its thickness size toward the suction opening portion 561A. That is, the opening area in the upper portion of the bottom face portion 561 may be formed larger than the opening area in the lower portion of the bottom face portion 561.

INDUSTRIAL APPLICABILITY

The present invention can be used for the projector, which modulates the light beam emitted from the light source according to image information, and magnifies and projects it so as to form an image.

What is claimed is:

1. A projector, constituted by including a light source lamp and comprising: a light source device formed with a light source cooling air flow channel for introducing a cooling air into said internal light source lamp; an illumination optical system for subjecting a light beam emitted from this light source device to an optical processing; and an optical part housing for housing optical elements constituting this illumination optical system;

wherein said optical part housing is formed with a pair of optical element cooling opening portions oppositely arranged by mutually pinching said optical elements in order to allow the cooling air to pass through according to the arrangement of said optical elements; and said projector comprising a fan, of which a suction port is opposed to one opening portion from among the pair of optical element cooling opening portions and an exhaust port is connected to said light source cooling air flow channel, wherein an external surface of said optical part housing is formed with a rib-shaped protrusion so as to entirely surround the one opening portion from among the pair of optical element cooling opening portions as well as the suction port of said fan.

2. The projector according to claim 1, further comprising an electro optic device for modulating the light beam emitted from said light source device according to image information, wherein said other optical element cooling opening portion is arranged in opposition to a control base for controlling this electro optic device.

3. The projector according to claim 1, wherein said light source device comprises a reflector for aligning the emission direction of the light beam emitted from said light source lamp and a transparent plate for closing a light emitting surface of this reflector, wherein a coupling portion of said reflector and the transparent plate is formed with a pair of lamp cooling opening portions symmetrically arranged with an optical axis of said reflector as a center, and wherein a gap between said exhaust port and any one of the pair of lamp cooling opening portions is connected through a duct member.

4. The projector according to claim 3, wherein said duct member is formed with a rectifying plate for rectifying the cooling air exhausted from said exhaust port.

5. The projector according to claim 3, wherein an opening and closing mechanism for closing said lamp cooling opening portion is provided at the time when the light source device is removed from said optical part housing.

6. The projector according to claim 1, wherein an internal surface in a vicinity of the one of said optical element cooling opening portions is formed with an air accumulator consisting of a concave step portion.

7. The projector according to claim 2, wherein said light source device comprises a reflector for aligning the emission direction of the light beam emitted from said light source lamp and a transparent plate for closing a light emitting surface of this reflector, wherein a coupling portion of said reflector and the transparent plate is formed with a pair of lamp cooling opening portions symmetrically arranged with an optical axis of said reflector as a center, and wherein a gap between said exhaust port and any one of the pair of lamp cooling opening portions is connected through a duct member.

8. The projector according to claim 4, wherein an opening and closing mechanism for closing said lamp cooling opening portion is provided at the time when the light source device is removed from said optical part housing.

9. The projector according to claim 2, wherein an internal surface in a vicinity of the one of said optical element cooling opening portions is formed with an air accumulator consisting of a concave step portion.

10. The projector according to claim 3, wherein an internal surface in a vicinity of the one of said optical element cooling opening portions is formed with an air accumulator consisting of a concave step portion.

11. The projector according to claim 4, wherein an internal surface in a vicinity of the one of said optical element cooling opening portions is formed with an air accumulator consisting of a concave step portion.

12. The projector according to claim 5, wherein an internal surface in a vicinity of the one of said optical element cooling opening portions is formed with an air accumulator consisting of a concave step portion.

13. The projector according to claim 1, wherein the cooling air is directly fed into the suction port of the fan from the opposed one opening portion from among the pair of optical element cooling opening portions.

* * * * *